United States Patent [19]

Nysen et al.

[11] Patent Number: 5,164,985

[45] Date of Patent: Nov. 17, 1992

[54] PASSIVE UNIVERSAL COMMUNICATOR SYSTEM

[76] Inventors: Paul A. Nysen, 223 Rainbow Street, Randwick 2031 NSW; Raphael Tobias, 42 Melbourne Road, East Lindfield, 2070 NSW, both of Australia

[21] Appl. No.: 477,996

[22] PCT Filed: Oct. 26, 1988

[86] PCT No.: PCT/AU88/00416

§ 371 Date: Apr. 16, 1990

§ 102(e) Date: Apr. 16, 1990

[87] PCT Pub. No.: WO89/04093

PCT Pub. Date: May 5, 1989

[30] Foreign Application Priority Data

Oct. 27, 1987 [AU] Australia ............... PI5107
May 2, 1988 [AU] Australia ............... PI8011
Jun. 8, 1988 [AU] Australia ............... PI8687
Sep. 27, 1988 [AU] Australia ............... PJ0632

[51] Int. Cl.⁵ .............. H04K 1/02; G08B 13/14; G01S 13/00; H04B 1/38
[52] U.S. Cl. ........................... 380/9; 340/572; 342/44; 342/50; 342/60; 375/1; 375/7; 455/13.1; 455/19; 455/73; 455/127
[58] Field of Search ........... 455/73, 127, 19, 13; 375/1, 7; 342/60, 50, 44; 380/9; 340/572

[56] References Cited

U.S. PATENT DOCUMENTS

| | | | |
|---|---|---|---|
| 2,812,427 | 11/1957 | Magondeaux | 455/19 |
| 2,812,428 | 11/1957 | Rath | 455/19 |
| 2,851,592 | 9/1958 | Webster | 455/19 |
| 2,864,943 | 12/1958 | Schultz | 342/50 |
| 3,790,945 | 2/1974 | Fearon | 340/572 |
| 3,925,784 | 12/1975 | Phelan | |
| 4,086,504 | 4/1978 | Ezell et al. | 342/50 |
| 4,210,910 | 7/1980 | Wohlers | |
| 4,466,125 | 8/1984 | Kanayama | 342/44 |
| 4,479,246 | 10/1984 | Young | 455/50 |
| 4,686,513 | 8/1987 | Farrar et al. | 340/572 |
| 5,021,790 | 6/1991 | Ohta et al. | 342/44 |
| 5,023,600 | 6/1991 | Szklany et al. | 340/572 |

Primary Examiner—Stephen C. Buczinski
Attorney, Agent, or Firm—Sprung Horn Kramer & Woods

[57] ABSTRACT

A communication system includes a base station, called a "Controller" and one or more remote or satellite stations, each called a "Communicator". The controller arbitrates, controls and communicates with the communicators which are in range to receive its transmissions. The communicators receiving a particular controller's transmission form a network for that controller for the period in which reception occurs. The controller is the only generator of electromagnetic radiation which it modulates with information relating to its own identity, transactions it undertakes and information it transfers. Each communicator modulates and re-radiates the received transmission using back-scatter. Back-scatter re-radiation keeps the communicator design simple and allows for very sensitive receiver design in the controller. In operation, the controller initiates communication with each communicator by establishing, through a handshake exchange, the unique communications channel it will maintain with that communicator. Once channels are established, the controller repetitively polls each communicator for a sequential, cumulative interchange of data. The controller continually looks out for new communicators entering its network and de-activates polling of communicators whose transactions are complete. Whenever a network is not active because there are no communicators present, or any in need of a transaction or data interchange, the controller polls at a reduced rate.

69 Claims, 18 Drawing Sheets

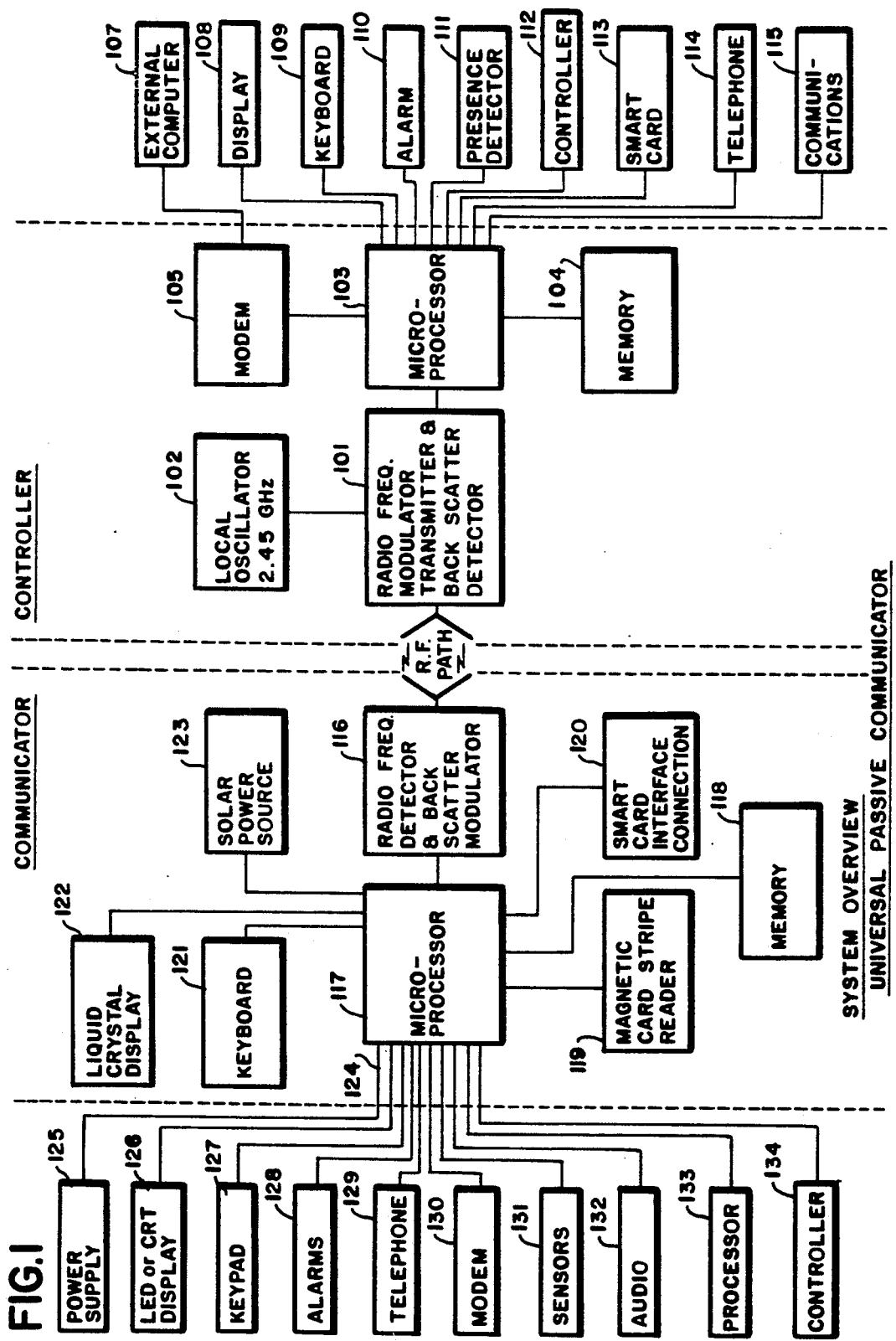

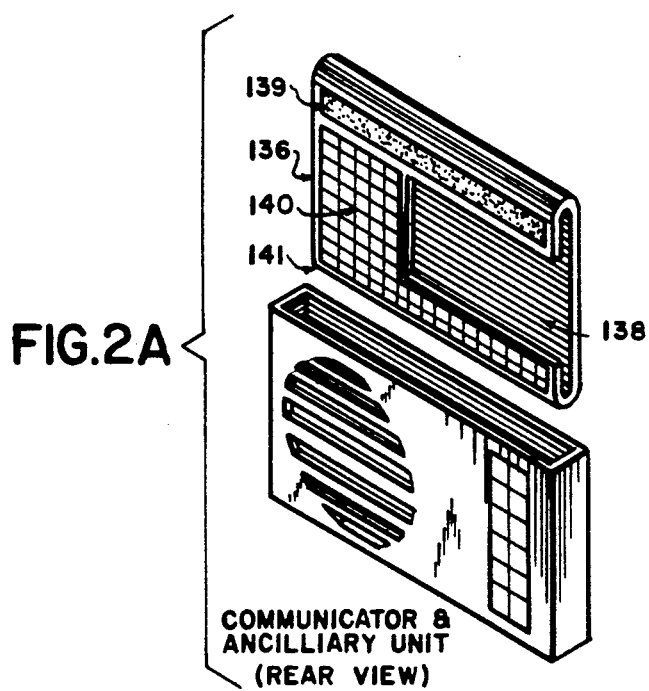
FIG.2A COMMUNICATOR & ANCILLIARY UNIT (REAR VIEW)
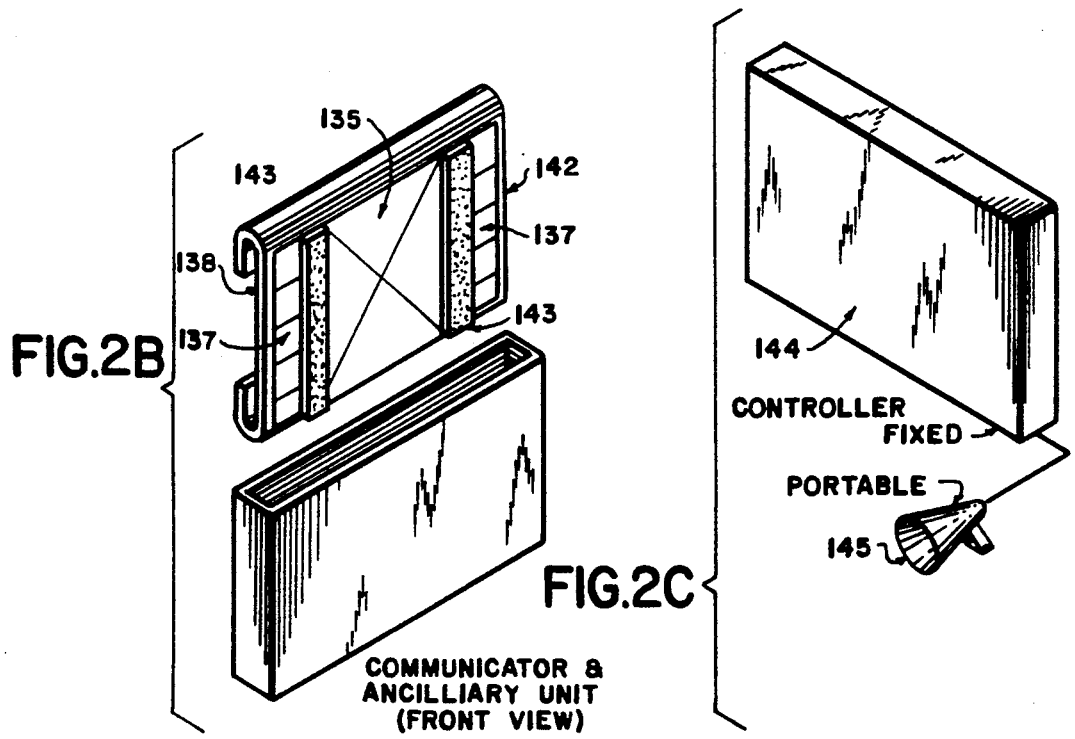
FIG.2B COMMUNICATOR & ANCILLIARY UNIT (FRONT VIEW)
FIG.2C CONTROLLER FIXED / PORTABLE

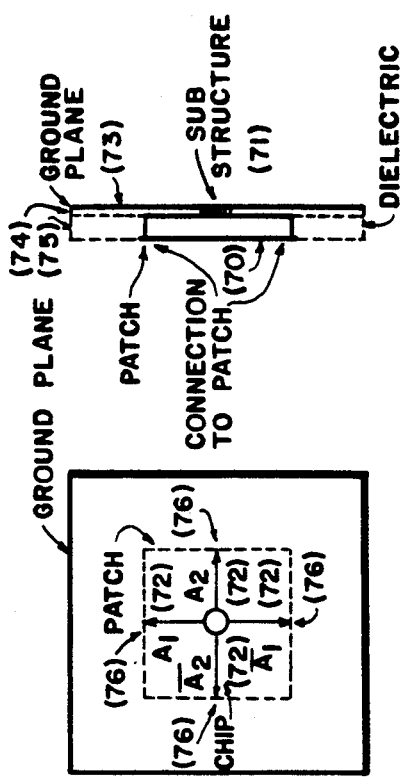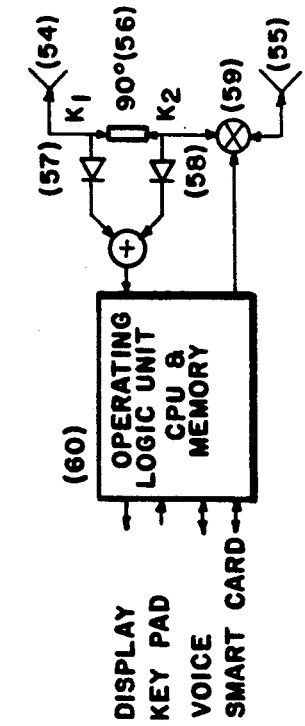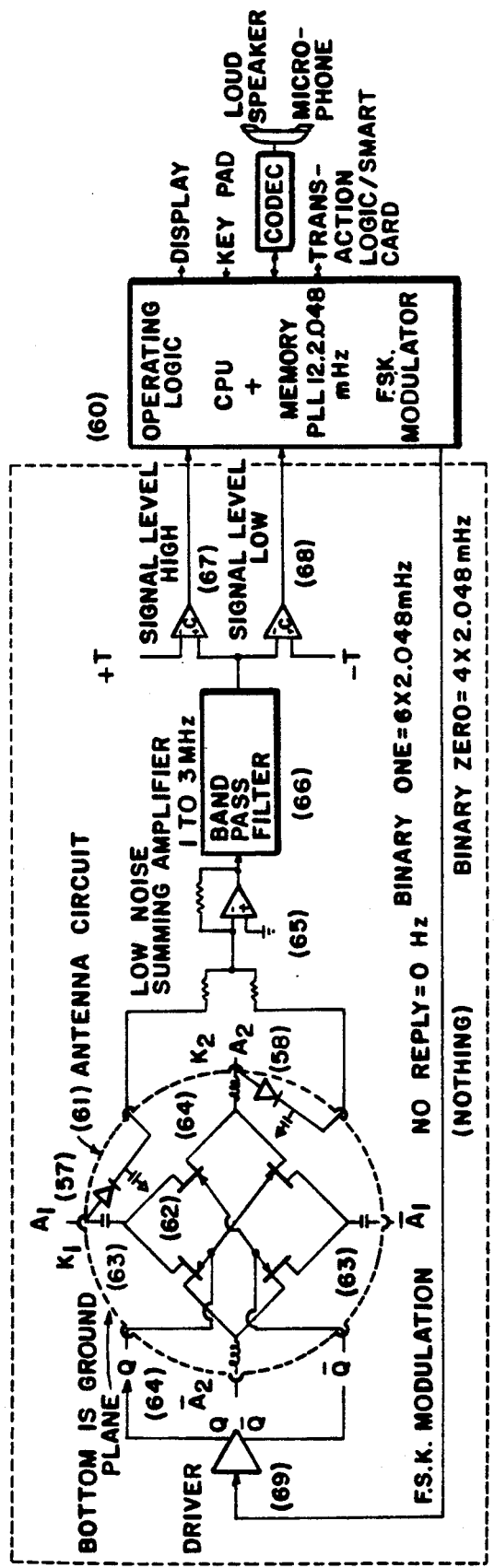

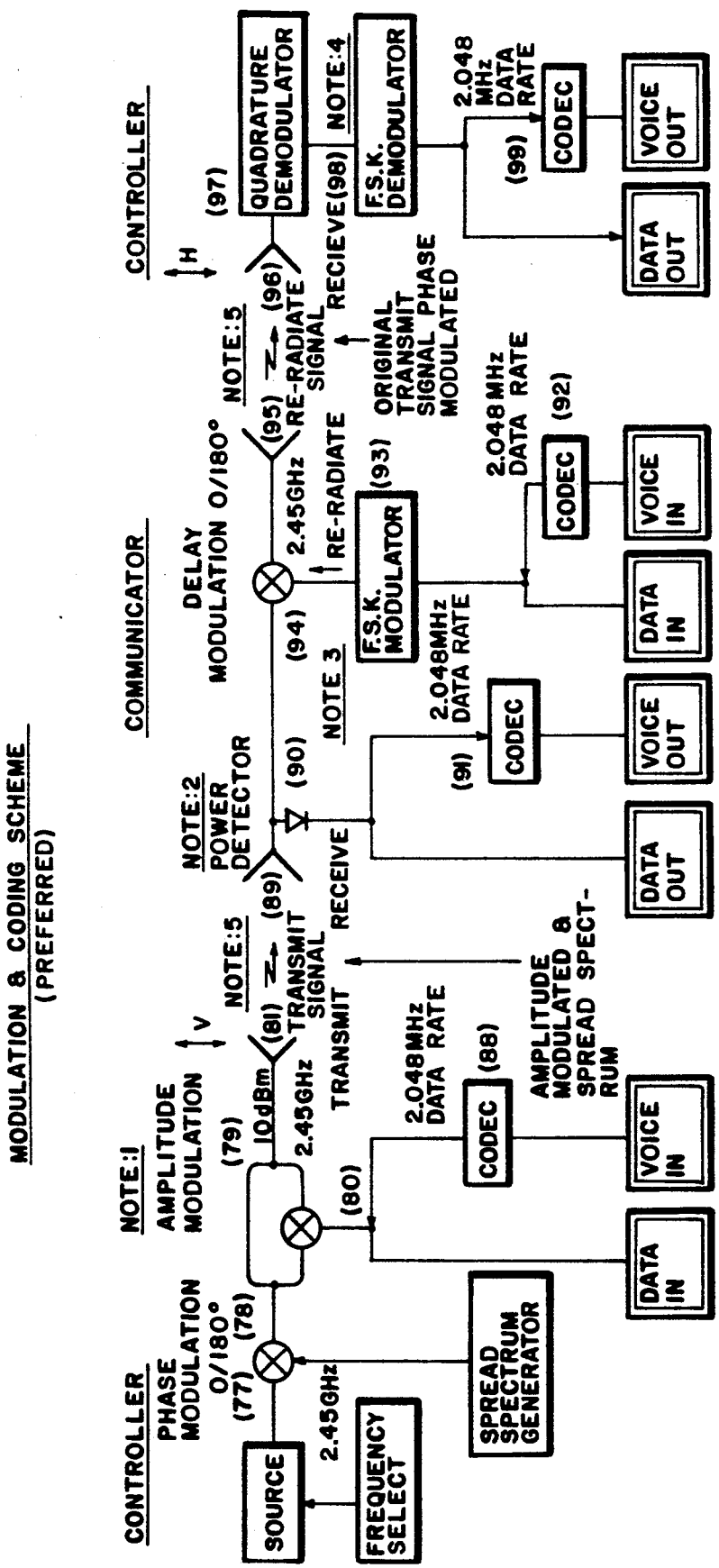
FIG.IOA

NOTES FOR FIG.10A

1. AMPLITUDE MODULATION CODING SCHEME (82)

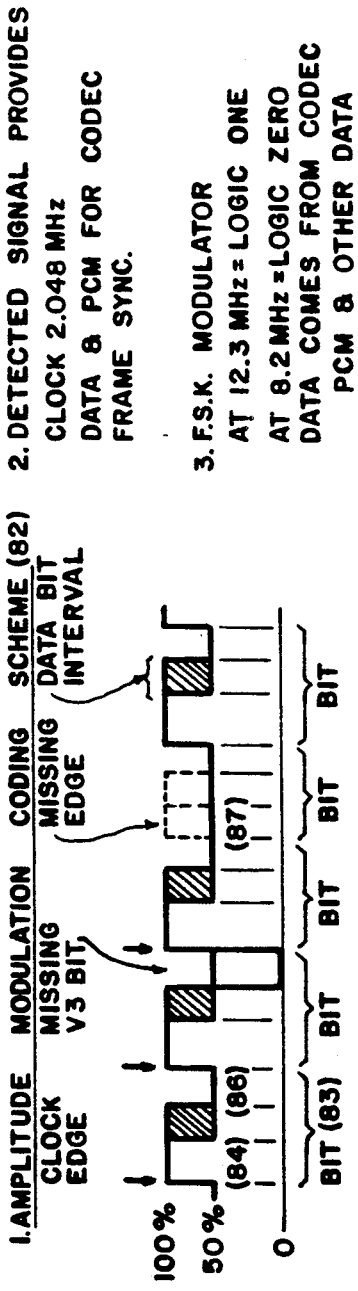

2. DETECTED SIGNAL PROVIDES
   CLOCK 2.048 MHz
   DATA & PCM FOR CODEC
   FRAME SYNC.

3. F.S.K. MODULATOR
   AT 12.3 MHz = LOGIC ONE
   AT 8.2 MHz = LOGIC ZERO
   DATA COMES FROM CODEC
   PCM & OTHER DATA

4. F.S.K. DEMODULATOR
   12.3 MHz = LOGIC ONE
   8.2 MHz = LOGIC ZERO
   IF BOTH 12.3 & 8.2 MHz OCCUR AT SAME TIME A
   DATA COLLISION IS INDICATED.

5. SIGNAL POLARIZATIONS
   THE TRANSMIT AND RE-RADIATE SIGNALS ARE CROSS
   POLARISED

FEATURES:
ENSURES AT LEAST 50% CARRIER PRESENT
BIT INTERVALS ARE EQUAL PERIODS
SELF CLOCKED CODE
PCM FROM CODEC AND DATA MODULATES CARRIER
DATA BIT INTERVAL LOGIC HIGH – 100%
                   LOGIC LOW – 50%
MISSING EDGE USED TO PROVIDE FRAME SYNC
(OPTIONAL)

FIG.10B

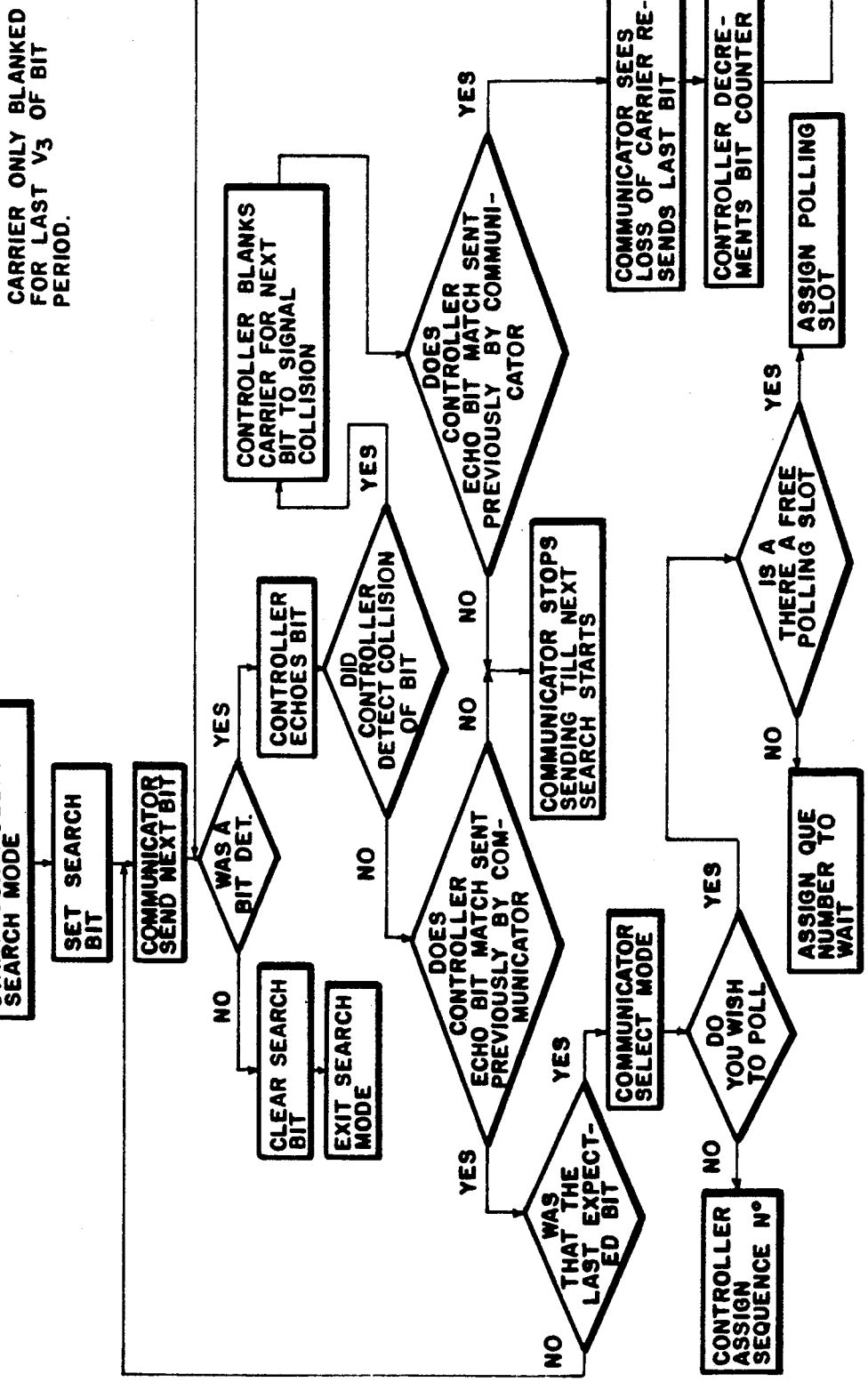
FIG.12 MULTIPLE COMMUNICATOR ACQUISITION FLOW CHART

FIG.14  LOCAL AREA CONTROL NETWORK
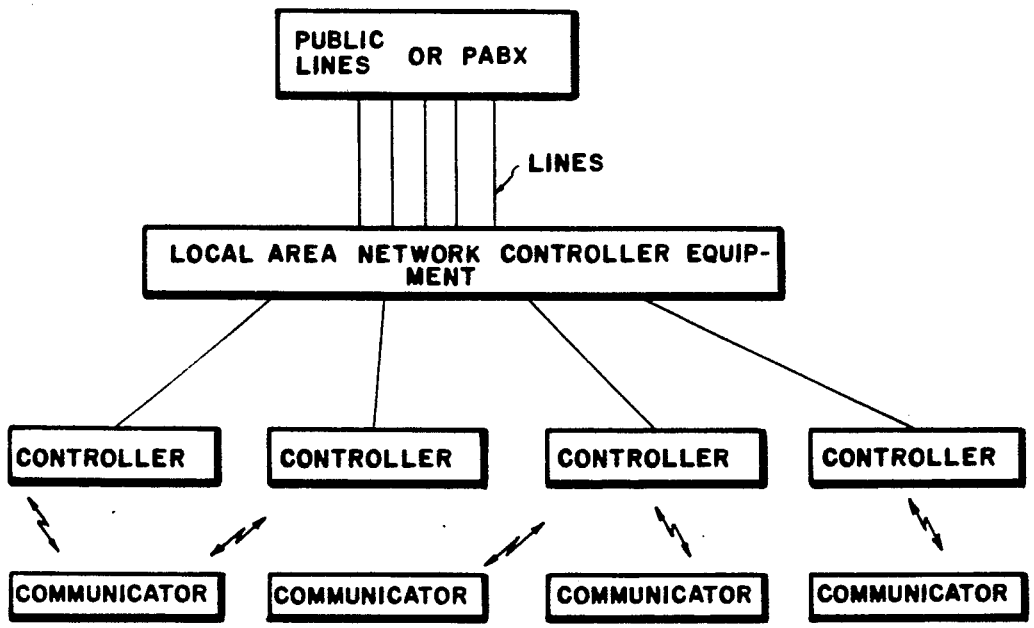
FIG.15  CONTROLLER MECHANICAL OUTLINE
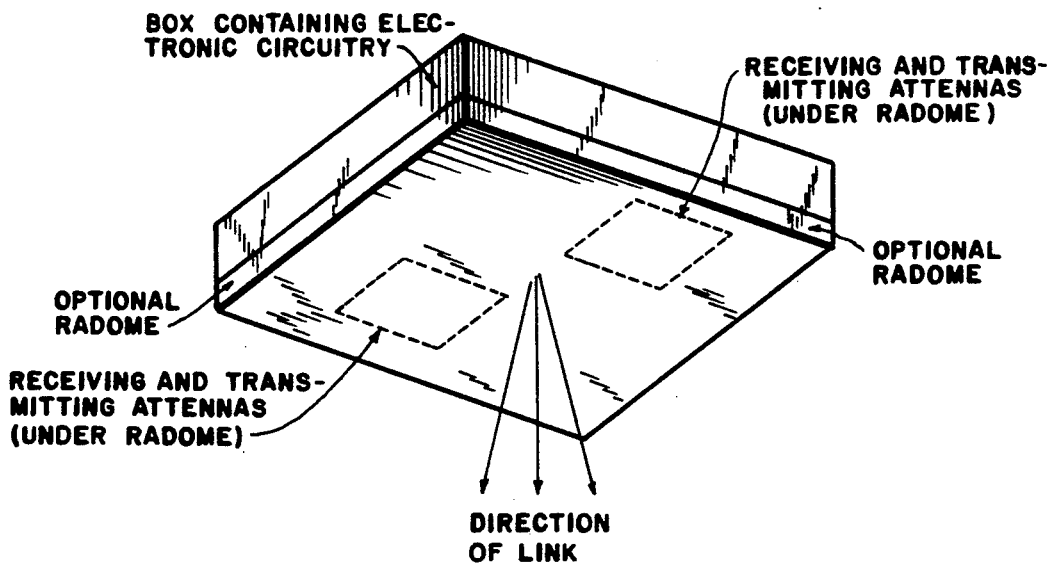

AMPLIFIER WITH HYBRID ISOLATION

AMPLIFIER WITH CIRCULATOR ISOLATION

LINEAR POLARIZATION
COMMUNICATOR AMPLIFIER

DETECTOR SIGNAL OUT

SIGNAL COVERAGE OF
MULTIPLE MICROPLEXORS

PASSIVE UNIVERSAL COMMUNICATOR SYSTEM

BACKGROUND OF THE INVENTION

With the advent of modern communication and information processing equipment we are increasingly subjected to a world that demands accuracy, quick turn-around, convenience and simplicity of use. As our world becomes more dependent on electronic and automatic means of information transfer, verification, validation and transaction, we must be able to assure and secure this information.

Along with the movement of information comes an ever-increasing demand on our radio frequency spectrum and the manner in which it is used.

The motivation behind this invention is to allow simple communication from multiple remote stations to and through a master controlling station. Further it is essential that the remote station be simple, easy to use, only require a self-contained low power source and be of low cost. Moreover with the larger number of remote stations anticipated, it is essential that the emissions do not overcrowd the radio spectrum, whether by design or fault.

SUMMARY DESCRIPTION OF INVENTION

System Description

The invention is a system composed of two distinct parts, the master or base station called the Controller and the remote or satellite station called the Communicator.

Both the Controller and the Communicator may be mobile, however it is generally expected that the Controller will be in a fixed location.

The Controller arbitrates, controls and communicates with Communicators which are able to receive its transmissions. The Communicators receiving a particular Controller's transmission form the network for that Controller for the period in which reception occurs.

Communicators will communicate with all controllers whose transmission they receive.

The Controller is the only generator of electromagnetic radiation which it modulates or codes with information relating to its own identity, transactions it undertakes and information it transfers.

The preferred electromagnetic radiation is in the radio spectrum at a frequency of 2.45 gigaHertz.

Each Controller and each Communicator has a unique, coded identity.

In operation the Controller established communication with a Communicator for the first time by establishing through a handshake exchange the unique communications channel it will maintain with that Communicator.

A channel may be established by the Controller by utilising an amplitude or frequency modulation technique or other continuous wave means of transmitting data and using a 'handshaking' data interchange with each Communicator to establish the network relationship. The preferred means is to use an amplitude modulation transmission and to establish a repetitive, timed period for data communication with each Communicator in each Controller's network.

The Controller transmits a modulated, repetitive long amplitude modulated continuous wave signal and the Communicator re-transmits the received radio frequency energy as a shorter, pulse coded data train using frequency shift keying techniques in the preferred implementation. Each pulse train is equivalent in length to the Controller's long continuous wave pulse.

Once channels are established the Controller repetitively polls each Communicator for a sequential, cumulative interchange of data.

The Controller continually looks out for new Communicators entering its network. The Controller can de-activate polling of Communicators whose transactions are complete.

The Controller detects the data from each Communicator by detecting radio frequency energy which is transmitted as a modulated re-radiation of the transmitted Radio Frequency energy from the Controller which is received by each Communicator.

The preferred means of achieving the re-radiation by the Communicator is to modulate and radiate the received transmission using back-scatter. In this way the Controller only has to detect information back scatter modulated on its own carrier.

Back-scatter re-radiation allows for very sensitive receiver design in the Controller and keeps the Communicator design simple. Furthermore it allows for the application of very sophisticated transmission modulation such as spread spectrum or chirp which may be invoked to eliminate interference from other controllers and incidental and intentional sources. This type of modulation minimises unwanted interception.

Whenever a network is not active either because there are no Communicators present or any in need of a transaction or data interchange, the Controller will then poll at a reduced rate so that there will not be a continuous radiation of unutilised radio frequency energy illuminating the environment.

A Communicator can only directly interact with a Controller and not with another Communicator.

A Communicator may communicate with other Communicators by using a Controller or its network Controller in combination with other Controllers to form a relay link.

A Communicator can only interact with a Controller whose received signal is above a threshold level which allows both detection of the modulated data and subsequent modulation of the received energy to produce a back scatter modulated return transmission to the Controller.

The bi-directional data communication interchange will be controlled by the timing clocked data coming from the Controller. The communication may be full duplex, quasi full duplex or half duplex The quasi full duplex system receives and sends alternate bits, each bit is sent in alternative receive and send bit periods.

In all other ways the information transaction is the same as for any data network allowing for handshaking, verification, security and validating using established methods.

The essential characteristic of this system is that the carrier is generated only by the Controller while Communicators only detect and back-scatter modulate a return transmission to facilitate bi-directional communications.

Transmission is not limited to radiation into mediums such as air or free space and may be achieved by cable, waveguide or other such bounded or guided medium.

Once bi-directional communication is established between Controller and Communicator it is possible to interface either or both the external devices such as modems, reading devices, display devices, sensing and actuating devices. Some examples are computer modems, cash register modems, hand held terminal devices, card readers, smart card interfaces and readers, keyboards, displays, alarms, sensors, two way telephone, facsimile and such other devices.

The principal advantage of this system is that bi-directional communication can be achieved using a mobile communicator that is simple in design and construction and
 (a) requires only very little power for its internal processing and modulating functions, and,
 (b) no internal power source for radio frequency power generation.

BRIEF DESCRIPTION OF THE DRAWINGS

FIG. 1 is a block diagram illustrating the basic elements of the Passive Universal Communicator System according to the present invention.

FIG. 2, comprised of FIGS. 2a, 2b and 2c, illustrates the physical implementation of the communicator according to the present invention which may be used in a toll collection application.

Figure 4:
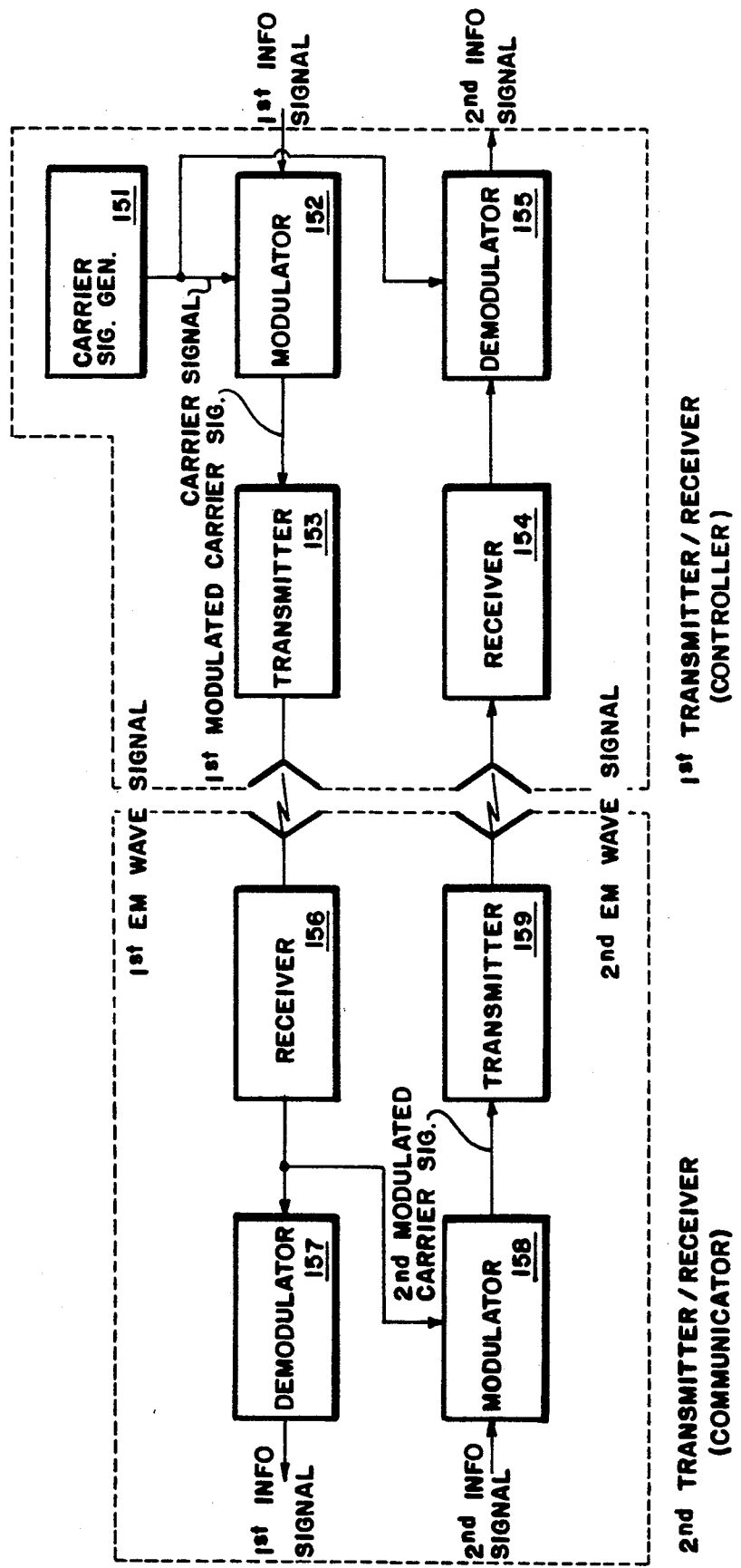
FIG. 4 is a block diagram showing the basic elements of the controller and a communicator in the system of FIG. 3.
Figure 5:
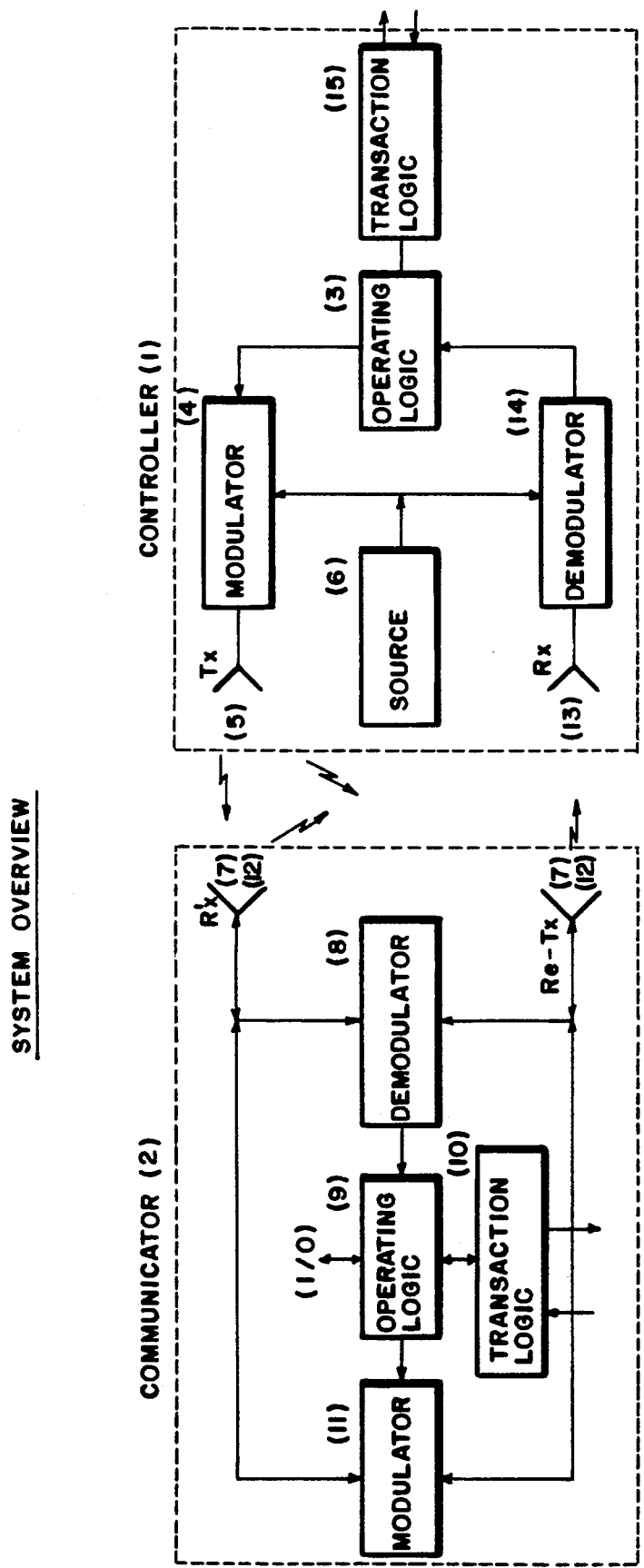
FIG. 5 is a more detailed breakdown of the elements shown in FIG. 4.

Diagram 7 is a functional block diagram of the communicator shown in FIGS. 4 and 5.

FIG. 8, which comprises FIGS. 8a and 8b, shows elevation and side views, respectively of the antenna employed in the communicator.

FIG. 9 is a detailed functional block diagram of the communicator illustrated in FIG. 7.

FIG. 10 is a functional block diagram illustrating the preferred modulation and coding scheme employed with the controller and communicator of FIGS. 4 and 5.

Figure 3:
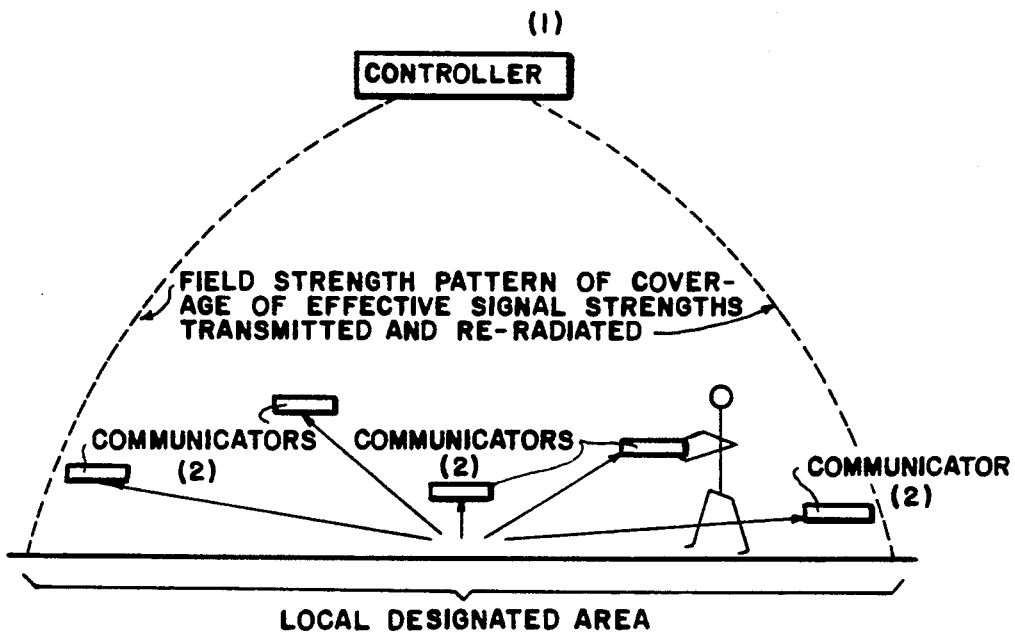
FIG. 3 is a representative diagram showing the basic positional relationships of a controller and a plurality of communicators in a mobile telephone system application of the present invention.
Figure 11A:
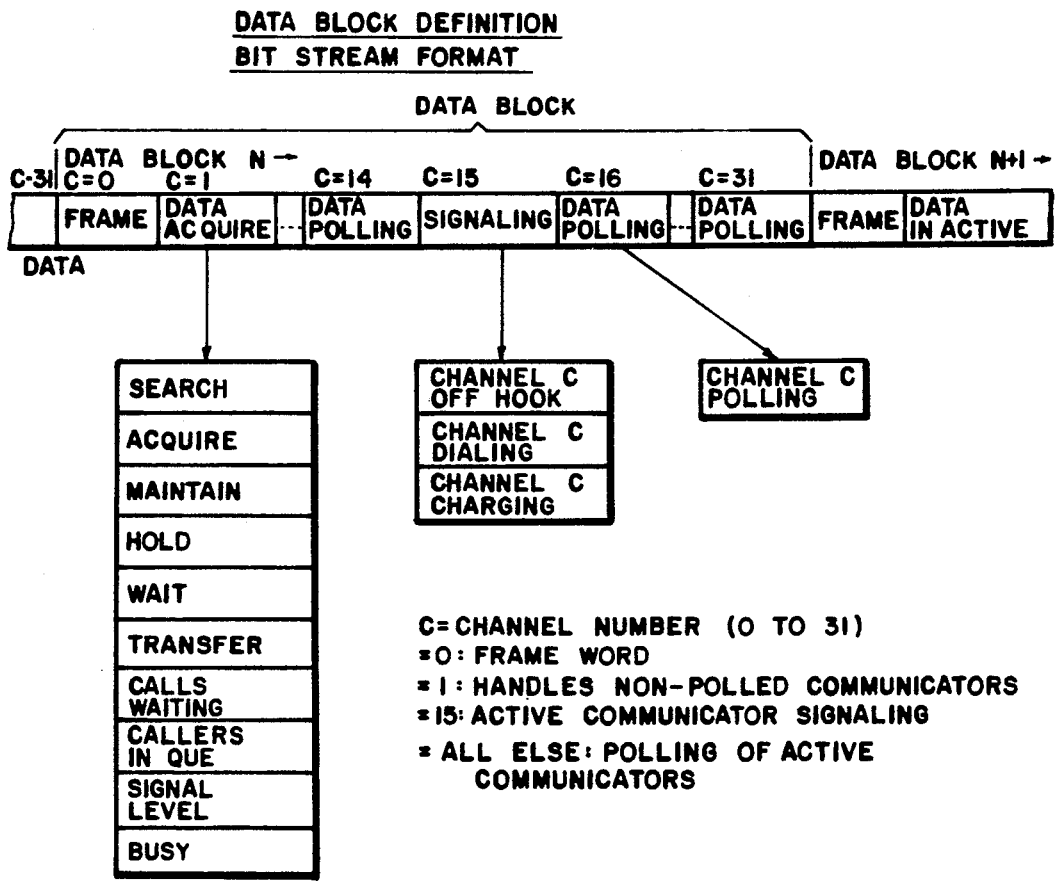
Figure 11B:
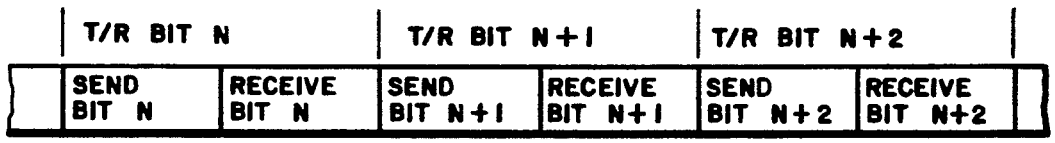

FIG. 11, which comprises FIGS. 11A and 11B, is a representational diagram of the bit stream format employed with the telephone system of FIG. 3.

FIG. 12 is a flow chart of the controller operation when setting up communication links between multiple communicators.

Figure 13:
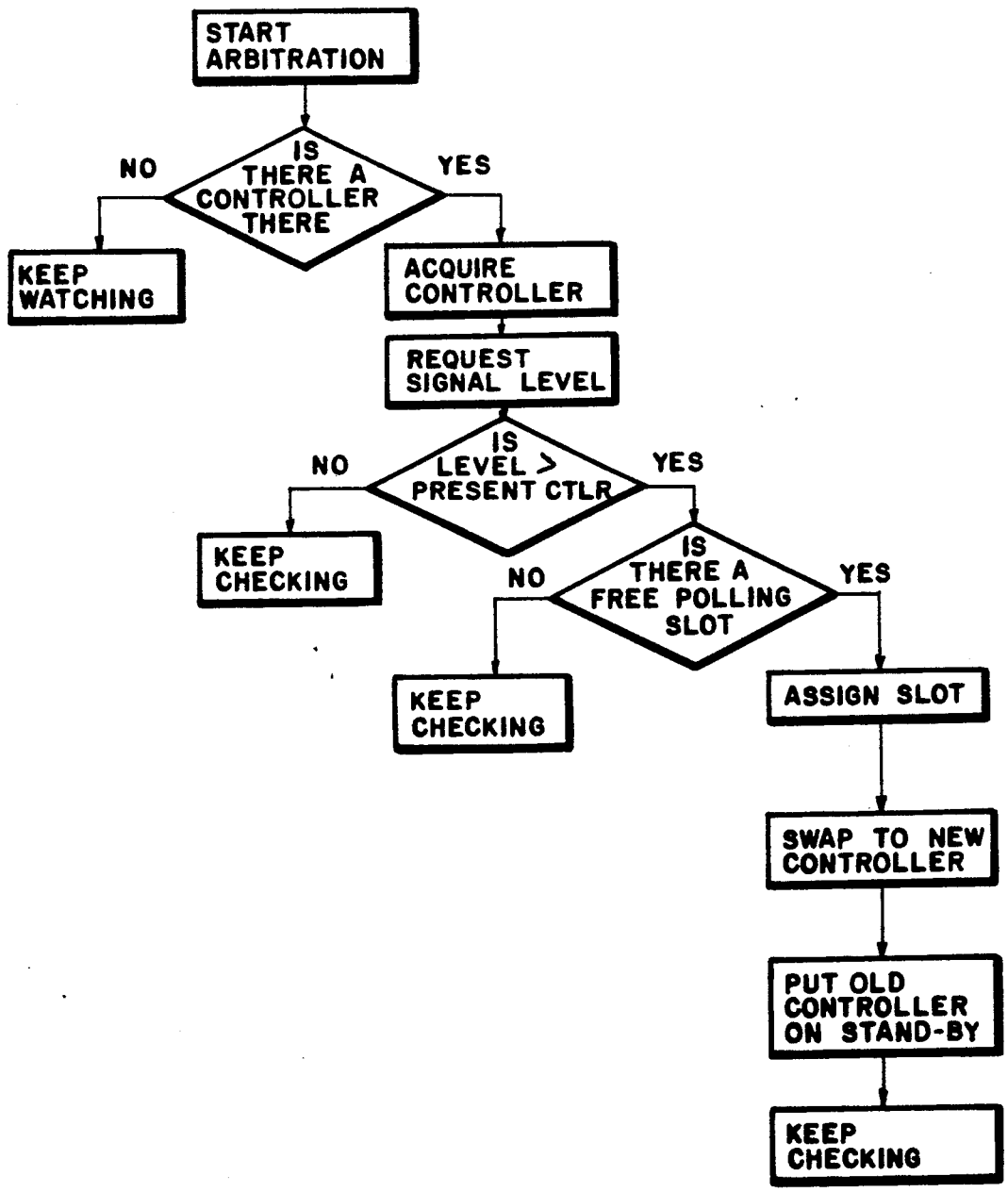

FIG. 13 is a flow chart of the controller operation when a communicator is within range of multiple controllers.

FIG. 14 is a block diagram of a local area control network employing the system of the present invention.

FIG. 15 is a prospective view showing the physical characteristics of the controller in the system of FIG. 3.

Figure 16:
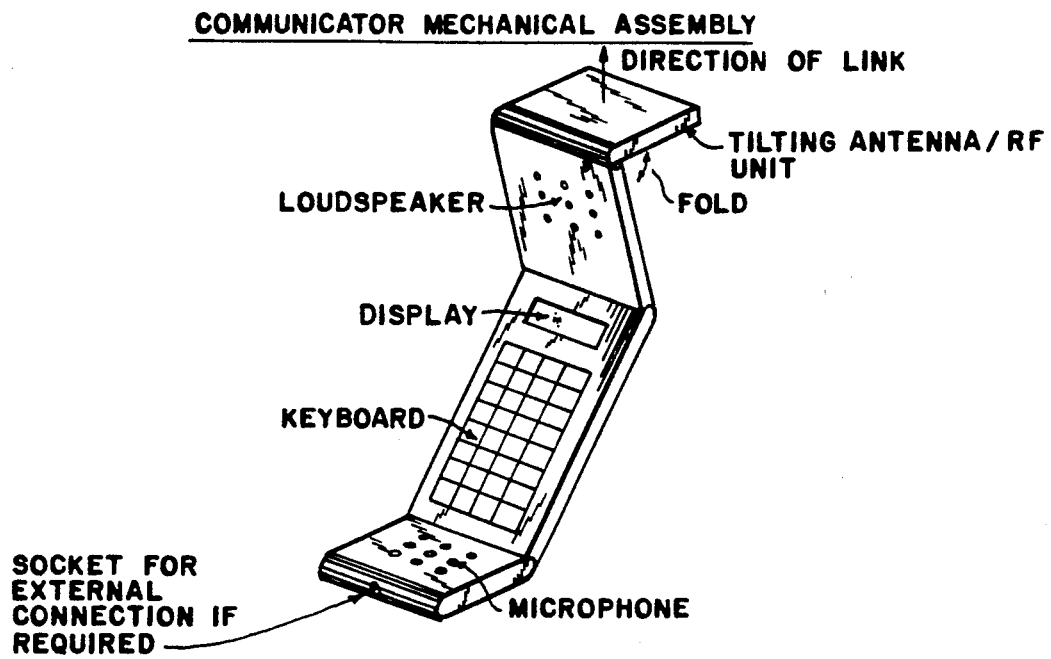
Figure 17:
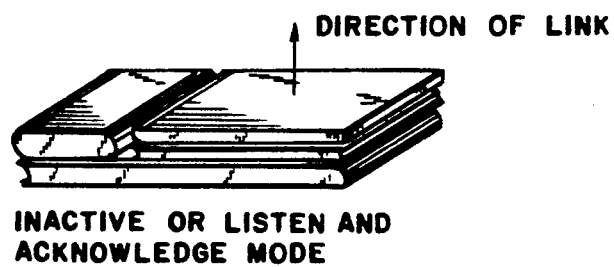
Figure 18:
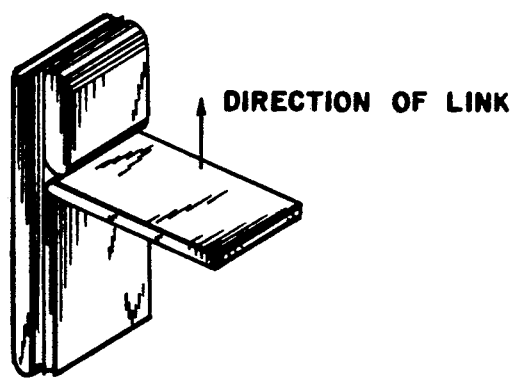

FIGS. 16, 17 and 18, respectively, illustrate the mechanical configuration of a communicator in the system of FIG. 3 in various modes of operation.

Figure 19:
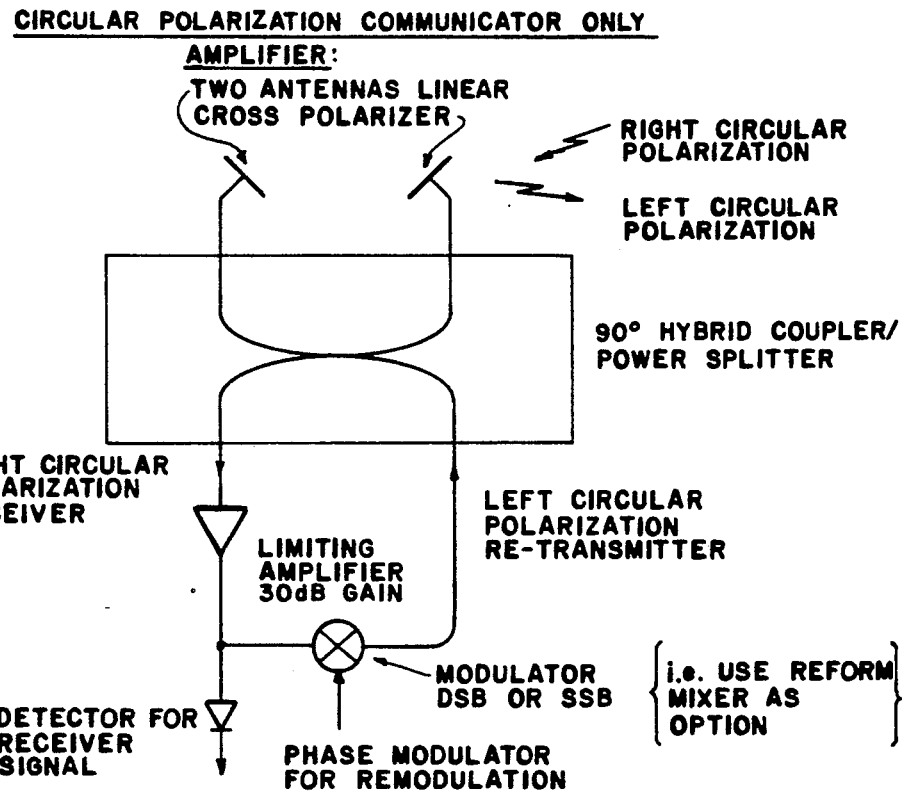

FIG. 19 is a representation of an amplifier with hybrid isolation usable with a circular polarization communicator.

Figure 20:
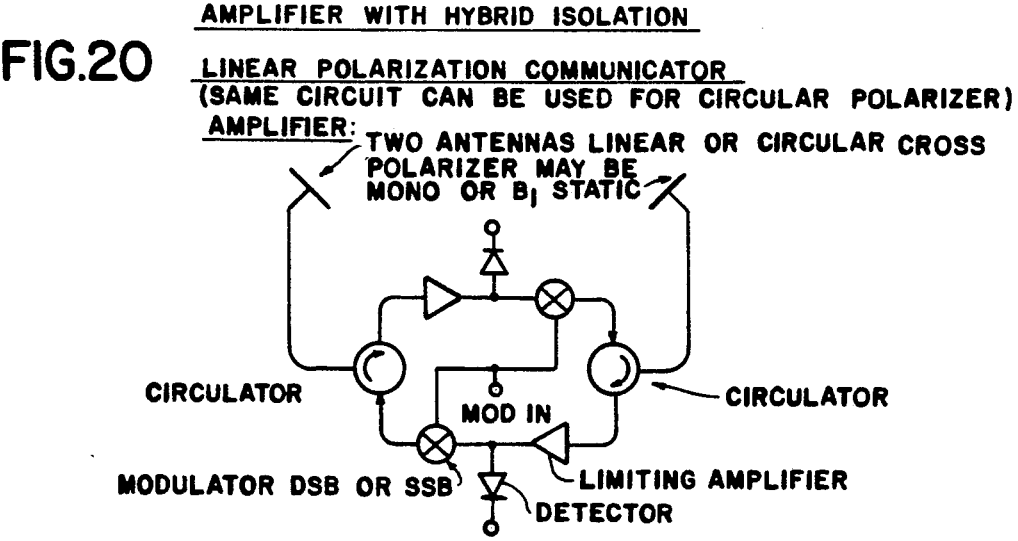

FIG. 20 is a representation of an amplifier with circulator isolation for a linear polarization communicator.

Figure 21:
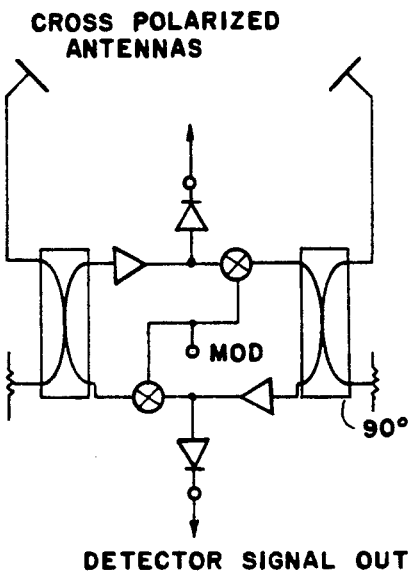

FIG. 21 is a representation of an amplifier with hybrid isolation for a linear polarization communicator.

Figure 22:
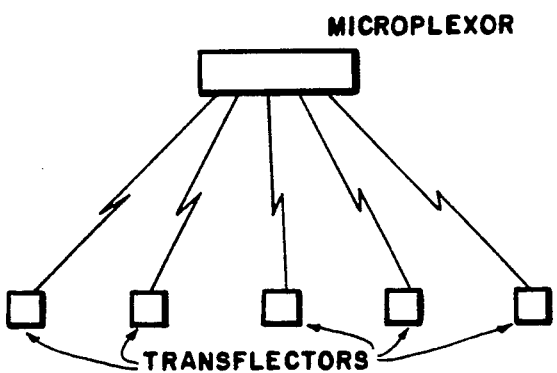

FIG. 22 illustrates a controller (microplexor) and plural communicators (transflectors) in a simple network system.

Figure 23:
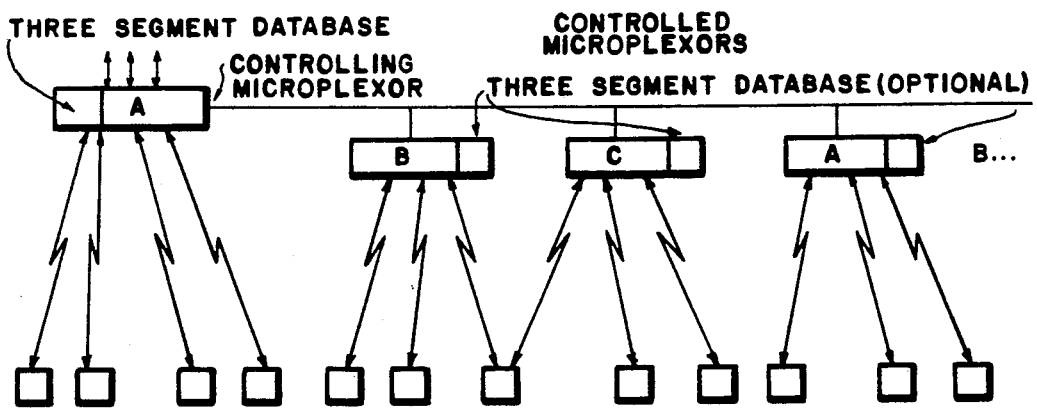

FIG. 23 illustrates a more complicated, network system capable of covering a wider area.

Figure 24:
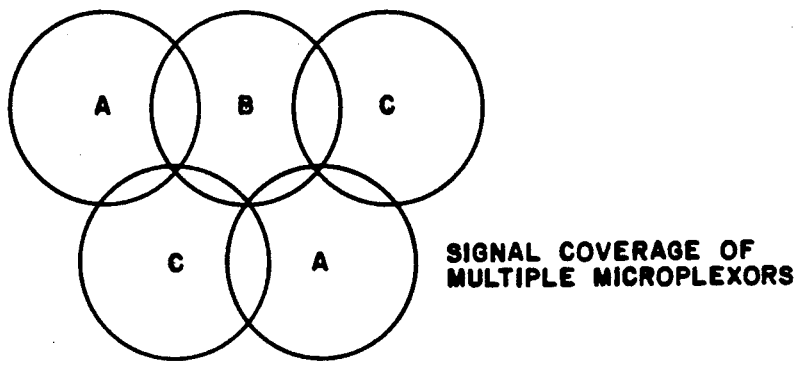

FIG. 24 illustrates the signal coverage of multiple microplexors in the system of FIG. 23.

Figure 25:
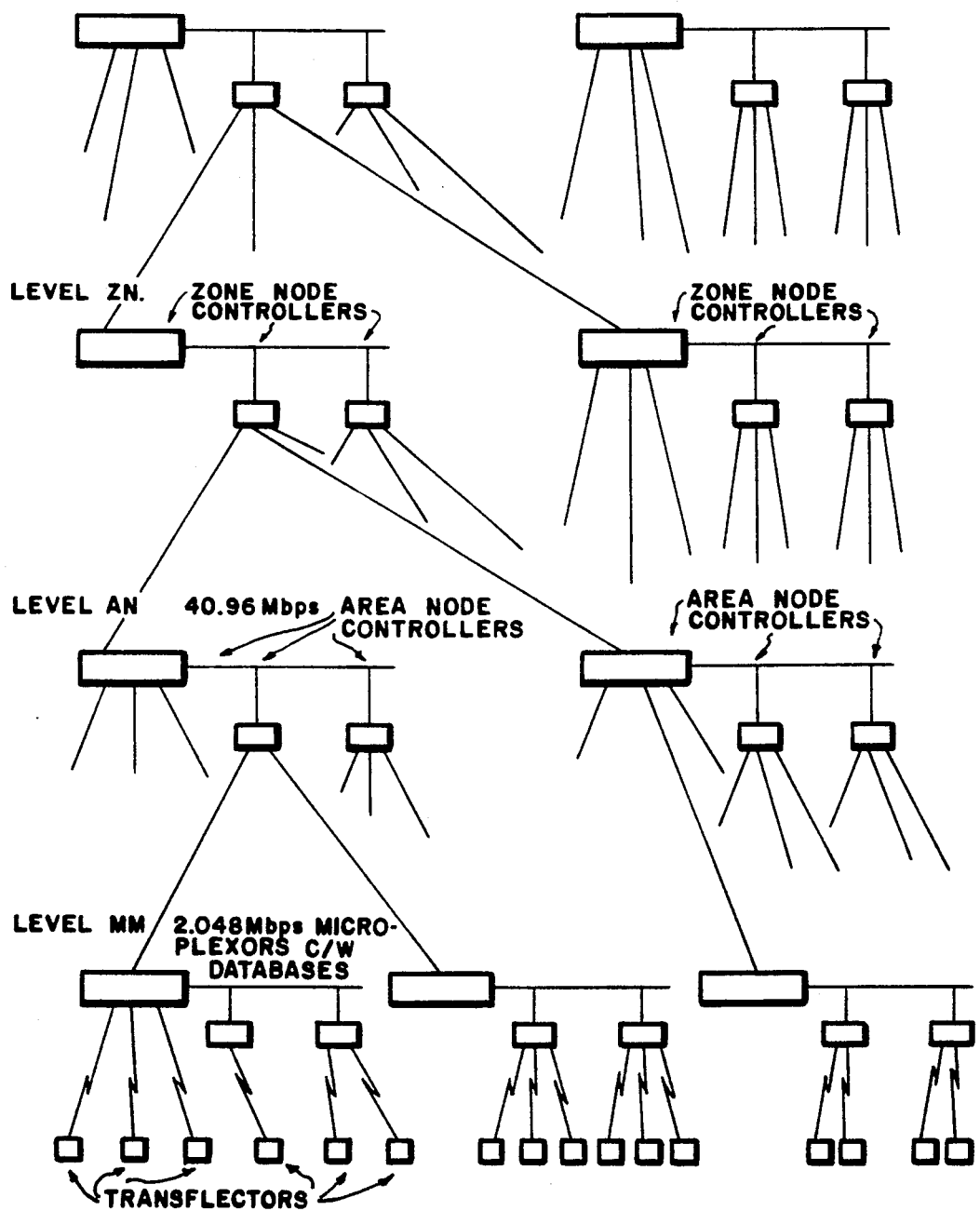

FIG. 25 is a representation of a complete network system comprising four heirarchical levels.

Figure 26:
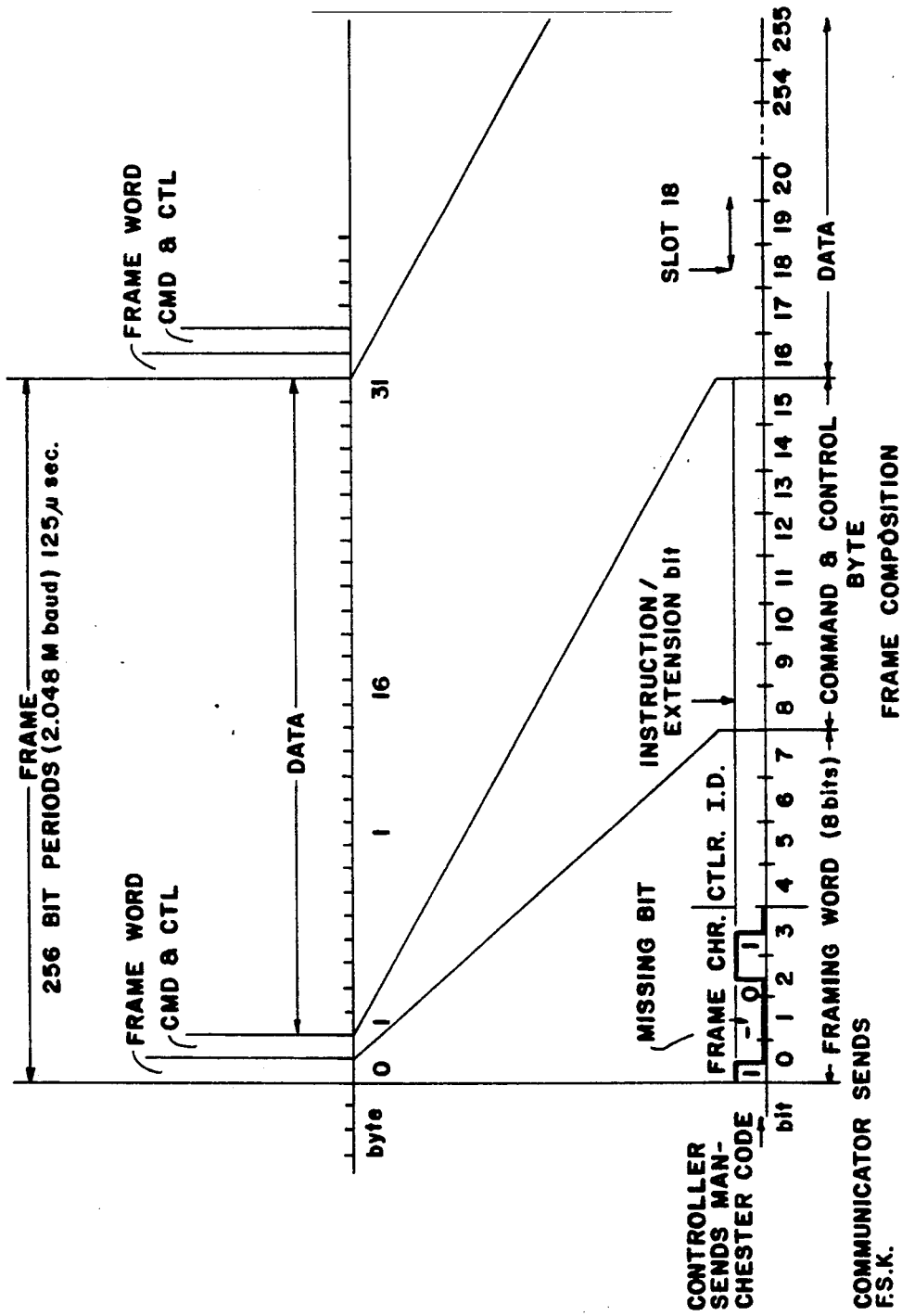

FIG. 26 illustrates in detail the preferred frame composition employed in the Passive Universal Communicator System according to the present invention.

DESCRIPTION OF THE PREFERRED EMBODIMENT

The Passive Communicator System shown in FIG. 1 consists of two major parts:

1. Controller (a) The Controller comprises:
 (i) Radio Frequency modulator/transmitter 101
 (ii) local oscillator 102
 (iii) processor 103
 (iv) memory 104
 (v) modem 105
 (vi) eternal interface 106

(b) The Controller may be connected to a range of devices including:
 (i) external computer 107
 (ii) display 108
 (iii) keyboard 109
 (iv) alarm 110
 (v) presence detector 111
 (vi) controller 112
 (vii) smartcard 113
 (viii) telephone 114
 (ix) communications device 115

(c) The Controller Sends out an electromagnetic signal which may be modulated or coded to provide information:
 (i) of its identify
 (ii) for transactions, and
 (iii) for information transfer.

(d) The Controller receives part of its own electromagnetic signal which has been re-transmitted by a receiving Communicator in which the Controller's own transmission has been received and modulated or encoded with the return information and the received radio frequency energy back-scatter transmitted back to the Controller.

(e) The Controller processes the return information both for transactions with the Communicator and also for local and remote processing of information received from the Communicator.

2. The Communicator (a) The Communicator (refer to FIG. 1) consists of each a:
 (i) Radio Frequency detector & back-scatter modulator 116
 (ii) Microprocessor 117
 (iii) Memory 118
 (iv) Magnetic card stripe reader 119
 (v) Smartcard interface connection 120
 (vi) Keyboard 121
 (vii) Liquid crystal display 122
 (viii) Solar power source 123
 (ix) External interface 124

(b) The Communicator receives the electromagnetic signal from the Controller and:
  detects the identify of the Controller;
  re-transmits its own identity code utilising the energy received from the Controller;
  performs transactions with the Controller;
  processes information received from the Controller;
  transmits internally generated data and data generated by devices associated with the Communicator to the Controller;
  provides displays, initiates controls and provides a range of outputs through the magnetic card stripe reader 119;
  and the smartcard interface connection 120 which may interface with:
    Smart and credit type cards which hold, process and supply transactional information.

Through the external interface 124 the Communicator can interface with:
  (i) external power supply 125
  (ii) external LED or CRT display 126
  (iii) external key pad 127
  (iv) alarms 128
  (v) telephone 129
  (vi) modem 130
  (vii) external sensors 131
  (viii) audio output device 132
  (ix) external processor 133
  (x) external controllers 134.

APPLICATION AS TOLL COLLECTION SYSTEM

The invention may be illustrated by the example of using the Communicator in a vehicle and the Controller to monitor and control access payments such as toll payments and also monitor vehicle identity.

The Controller in this case is substantially directive, allowing spatial discrimination to differentiate Communicators in the direct beam from Communicators physically outside the direct beam.

The transmit signal is low power (less than 1 watt) and may be spread spectrum modulated.

Clock and transmit data will be amplitude modulated onto the carrier in the quasi full duplex mode.

The Controller will coherently detect the back-scatter modulated signal using direct conversion via an image reject mixer to overcome the phase dependence of the reflected carrier on range.

Advantage may be taken of the detected upper and lower sideband to determine the motion of the Communicator, with respect to speed, direction and distance.

The Controller will use its internal processor to interface with a phone modem, mass storage device and external peripherals such as display, keyboard, alarm, presence detector, lights, external computer and the like.

The Communicator will detect the incident radio frequency transmission from the Controller using a detector diode to demodulate the amplitude modulation of the carrier. An alternative heterodyne system would require considerable power consumption and circuit complexity and would limit the sophistication permitted by the Controller carrier modulation.

The data received will be self clocked serial code. This data will be processed, related if necessary to any external device attached to the Communicator to determine the reply data stream to be re-transmitted using the back-scatter approach.

One method of achieving back-scatter is be driving the gate of a Field Effect Transistor or similar device which will in turn vary the radio frequency load across the Communicator antenna. Modulation will only occur during the permitted echo bit period.

The preferred frequency of operation is 2.45 GHz which is available for use under the FCC rules for field disturbance sensors. This frequency and higher frequencies have the advantage that high directivity can be achieved with antennas whose sizes are compatible with their application.

At 2.45 GHz a useable Controller antenna 144 (FIG. 2c) can be contained within a volume of 45 cm by 46 cm by 6 cm, or alternatively, a 10 cm diameter, 15 cm deep hand held antenna 145 can be used for operation directed communications.

An effective Communicator antenna can be contained in a volume of 7.6 cm by 7.6 cm by 0.42 cm.

An on-board microprocessor decodes the detected signal and controls the re-modulation for the reply data.

The transaction data processed by the microcomputer will read a credit card, complete a transaction in a smart card, or simply provide the Communicator identity for security tracking purposes.

Additional processing and display can be provided by an associated, connected unit.

User interaction can be provided at the Communicator via the use of a self contained display and keyboard.

A preferred implementation for the Communicator used in vehicular applications provides for a mechanical assembly which incorporates, (refer to FIG. 2):
  a patch antenna 135
  a processor/memory assembly 136
  solar cells 137
  a slot 138 incorporating a magnetic stripe credit card reader and smart card interface connector into which either card is placed for appropriate action.
  a liquid crystal display 139
  a membrane based keyboard 140
  an adapter/plug 141) to connect to an external function device, display and power source
  an enclosing housing 142
  two adhesive strips to attach the Controller to a vehicle windscreen 143

APPLICATION AS MOBILE TELEPHONE SYSTEM

This particular application relates to the use of the Passive Universal Communicator as a micro-cellular telephone and data transaction system.

Up to this time the only options available to make a voice telephone call are to use a telephone directly connected to an existing telephone network or a radio telephone of the conventional or cellular type having a signal generating transmitter and signal receiver at each end of the two-way radio link.

In the latter case above, the radio telephone connects the person calling or receiving a call into an existing telephone network.

While radio telephones are effective, they suffer from limitations in radio frequency channel capacity which creates an upper limit on the number of channels which can be provided to subscribers in an area determined by the radio coverage.

Radio links for telephone connections are also susceptible to the jamming or blocking of weak signals by stronger signals at, or close to the same frequency as the weaker signal.

Another potential weakness of radio telephones is that the signal generating transmitter at each end of a radio link provide two-way signal levels which make it relatively easy to eavesdrop on both send and receive transmissions.

The nature of present radio telephones in requiring a capability to generate their own signals at substantial power, and at precise frequencies makes them relatively expensive compared to the cost of a cable connected telephone handset. Their comparatively high power drain resulting from the conventional transmitting function also provides the need to either connect radio telephones to rechargeable batteries as in motor vehicles, or to frequently recharge or replace their internal batteries where these provide the power supply.

Public, coin operated telephones also have some limitations and present some inconvenience to their users.

Public telephones limit access to users to individual phone stations or booths, often restricted by the amount of space available. In busy locations such as transport terminals the limitations of numbers of working (non-damaged) booths often causes people to wait in line to make their call. Users need to have available the appropriate coins for each call, although developments now provide for credit or token card payment for calls. The existing equipment by its design is publicly easily accessible and thus provides simple access for willful damage.

This invention provides a new form of telephone system utilising the Passive Universal Communicator system which is an electro-magnetic two way signal exchange in which the signal power is generated at only one end of the two way link by a signal generating transmitter/receiver unit called the Controller.

The other end of the two way link, which does not generate an electro-magnetic signal of its own, providing return signals by re-radiating its received energy, is a personally portable signal receiver re-radiator telephone/transaction unit called the Communicator.

The signals between the Controller and the Communicator may be modulated by a number of methods to produce digital and/or analogue outputs at the Controller and Communicator.

These outputs provide data and/or audio to enable voice and data communication to take place in both directions either simultaneously or sequentially.

The Communicators do not of themselves generate electro-magnetic signals but receive signals generated by Controllers from which relevant audio and/or data is obtained. The Communicators re-radiate the electro-magnetic energy received from Controllers which energy is modulated by voice and/or data generated by the Communicator and received by Controller/s using a technique similar to modulated backscatter radiation.

Information of the basic principles of modulated backscatter radiation is in the public domain.

This invention utilises a principle similar to modulated backscatter in a unique configuration and design to create a new form of telephone and transaction system.

As shown in FIG. 3, each controller (1) radiates low power signals into local designated areas. Calls can only be made or received by an individual Communicator (2) when located in a local designated area and when its received signal level is high enough for its operation.

Controller antennas may operate in any plane, but it will be most effective system-wise if common radiating directions are used for common system applications so that users of Communicators can use a standard presentation or direction of their Communicator antennas Controllers will generally be positioned above the locally designated areas in which Communicators can operate, with their antennas radiating downwards so that their signal radiation is normal to horizontally oriented Communicator antennas positioned beneath them.

The frequency on which each communication takes place is determined by each Controller and given that the radiation from each Controller is limited to its immediate vicinity, then the only limitation on the number of Communicators which may operate at any one time world-wide is the number of Controllers installed and the telephone lines or communication channels allocated to each.

The system is not limited by radiated signal channel space. The system may operate in any of a range of frequencies including the microwave spectrum, infra red and above. The preferred frequency is 2.45 GHz in the microwave spectrum.

In addition to facilitating two way voice communication, the Communicator/Controller combination provide a means of conducting two way transactions. Amongst other applications, a transaction capability allows a secure identification and data transaction to take place such as a financial transaction.

The Communicator may include a computer or equivalent circuit and software of the 'Smartcard' type to provide the security, storage and processing of transactions.

Provided sufficient telephone lines or channels are connected to a Controller, then any number of Communicators up to the number of lines or channels available may simultaneously be in communication via each individual Controller up to the designed channel capacity of the Controller.

As illustrated in FIG. 3, in operation a person carrying a Communicator is able to make or receive calls when they are within the illuminated zone of a Controller and their Communicator indicates 'communicate ready' by establishing that an appropriate signal level exists and by transaction an exchange of identification between Communicator and Controller and being allotted a polling slot or placed in a waiting sequence.

To make a telephone call the transaction computer in the Communicator may be accessed by a secret PIN or some other transaction approving action which is keyed to activate a transaction such as a Smart/debit card or credit card transaction. Once the transaction is established, the telephone number required is then dialed in the conventional manner.

When connection is made, voice communication can proceed. The telephone system determines the charge rate. The charge rate can be displayed on the Communicator. On commencement of the call the telephone system commences to debit the 'Smartcard' or debit type card in specified charge units in advance. The call is timed and as each charge unit is used, a new charge unit is debited. Alternatively, the transaction may be charged to a specific account.

The Communicator is 'passive' in the signal generation sense, receiving the signal energy from the Controller, processing the received signal message and re-radiating the received signal energy from the Controller which is modulated with the return signal message back to the Controller a 'back-scatter' technique.

Logic circuitry and software 'lock' each Communicator into its presently communicating Controller.

Given the directivity of the Communicator antenna and the low signal levels used, eavesdropping is extremely difficult. Given the directive patterns of both Communicator and Controller antennas, any eavesdropping device used needs to be physically located between the Communicator and Controller to receive both signals.

Conventional public access or other appropriate method of encryption can be used to provide desired levels of secure communication.

FIGS. 4 and 5 both provide an overview of the system operation. FIG. 4 shows the essential elements of the two-way communication system between a first transmitter/receiver unit (Controller) and a second transmitted/receiver unit (Communicator). The Controller comprises a first device 151 for generating a carrier signal; a second device 152 for modulating the carrier signal with a first informational signal to produce a first modulated carrier signal; a third device 153 for transmitting the first modulated carrier signal as a first electromagnetic wave signal to the Communicator; a fourth device 154 for receiving a second electromagnetic wave signal transmitted by the Communicator to reproduce a second modulated carrier signal; and a fifth device 155 for demodulating the second modulated carrier signal to produce a second informational signal. The Communicator comprises a sixth device 156 for receiving the first electromagnetic wave signal transmitted by the Controller to reproduce the first modulated carrier signal; a seventh device 157 for demodulating the first modulated carrier signal to reproduce the first informational signal; an eighth device 158 for backscatter modulating the first modulated carrier signal with the second informational signal to produce a second modulated carrier signal; and a ninth device 159 for transmitting the second modulated carrier signal as the second electromagnetic wave signal to the Controller.

As shown in FIG. 5 the Controller (1) contains a Source (6) which generates the electro-magnetic signal, the Operating Logic unit (3) receives voice and/or data form an external source and provides an appropriate input to the Modulator (4) which modulates the electromagnetic signal with voice and/or data which is then radiated via the transmitting Antenna (5).

The Communicator 2 receives the electromagnetic signal transmitted by the Controller via its receiving Antenna (7) and (12). The received signal splits into two paths. The first path is to the Demodulator (8) where it is demodulated and the output is connected to the Operating Logic unit (9) which processes the received, demodulated voice/data signal which is provided as input to an appropriate Transaction Logic (10) and peripherals.

To provide a return communication, voice and/or data from the Transaction Logic (10) is connected to the logic unit which drives the Modulator (11) which modulates the signal received from the Controller (1) and is then fed to the transmitting Antennas (7) and (12) and re-radiates the return signal back to the Controller (1).

The Controller (1) receives the 'backscattered' signal from the Communicator via receiving Antenna (13). This signal is detected by the Demodulator (14) which uses part of the signal from the Source (2) as reference in its detection process. The demodulated signal is fed to the Operating Logic unit (3) from which it is connected to the Transaction Logic (15) in turn connected to external processing and communications circuitry.

The Controller transmit (5) and receiver (13) antennas may be integrated into the one antenna structure as may also be the Communicator receive and re-radiate antennas (7) and (12).

Figure 6A:
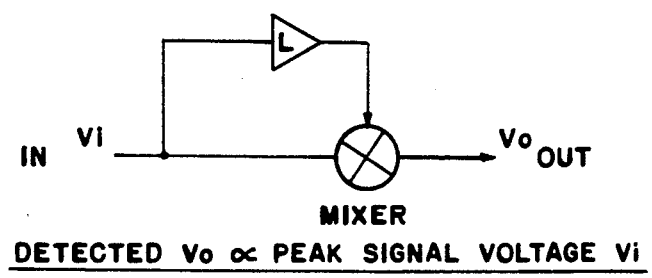
FIGS. 6A and 6B, is a functional block diagram of the controller shown in FIGS. 4 and 5.
Figure 6B:
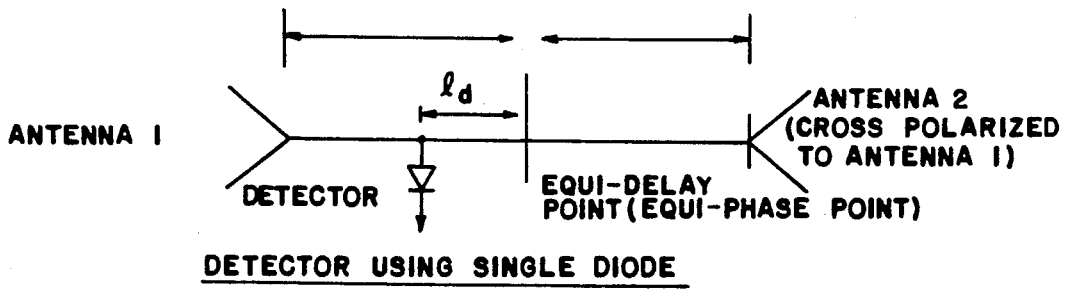
Figure 6:
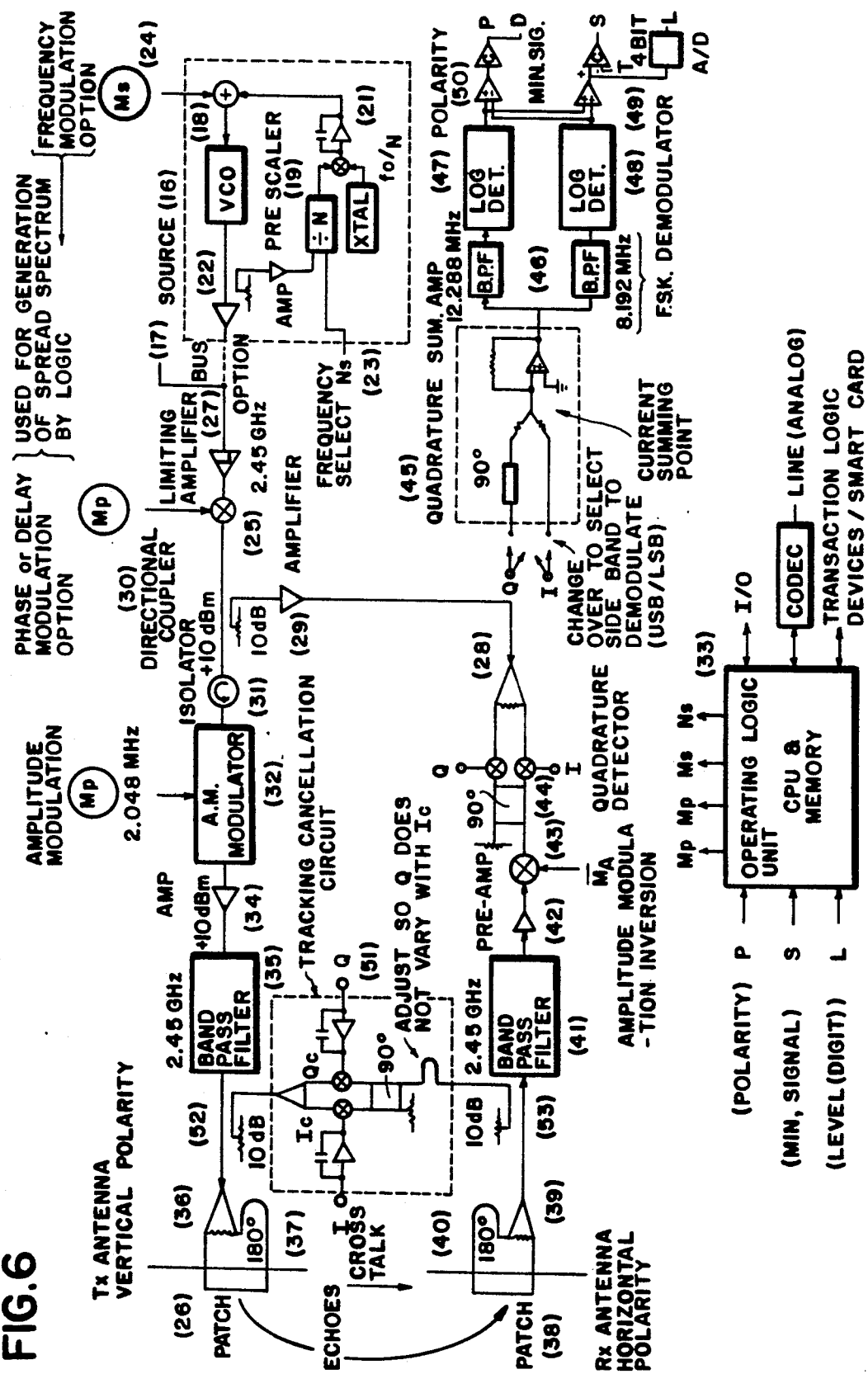
FIG. 6, which includes

Referring to FIG. 6, the Controller generally operates as follows in the preferred implementation:

To Transmit from the Controller

The Source (16) in the Controller provides the reference electro-magnetic signal. This signal may be supplied to the Controller by a remote and/or shared device via a suitable signal distributing bus (17) and operating on similar design principles.

This description relates to a design in which the Source is a component of the Controller. The Source (16) consists of Voltage Controlled Oscillator VCO (18) which generates the preferred frequency of 2.45 GHz.

This frequency is preferred because it enables an optimising balance between antenna, bandwidth, radiation pattern and size. This frequency lies in the band approved for Industrial, Scientific and Medical (ISM) applications which makes it generally available for the application.

The desired frequency may be determined by a control loop which phase locks the VCO (18) to a multiple, determined by a pre-scaler circuit (19) (divide by N counter), of the frequency output of a fixed frequency crystal oscillator (20). The controlling voltage for the VCO (18) is provided by the integrator (210)which determines the error signal from the product of the pre-scaler (19) output and the crystal oscillator (20).

The feedback signal to the control loop is provided via directional coupler (22).

A digital input (23) to the pre-scaler (19) is provided to change the frequency of the Source (16) to one of a number of pre-determined frequencies.

Spread spectrum transmission is preferred where security from jamming, eavesdropping and range-gating is required. This is achieved by one of several methods. The first is a frequency modulation option which is achieved by applying a pseudo random logic signal (24) to the VCO (18) input in addition to the integrator output (21).

A second spread spectrum transmission option which allows the selection of either phase or delay modulation is achieved by applying a pseudo random logic signal to mixer (25).

The output power of the Source will generally be such as to provide a transmitted power at the Controller transmit antenna (26) in the range 1-100 milliwatts so that radiated field strengths will be below prescribed safety limits for the preferred range and frequency.

The Source (16) has a coherence length which is much greater than the total of path length uncertainty and delay uncertainty in any internal devices such as filters and delay lines.

The preferred Controller transmit bandwidth is less than 20 MHz overall (typical for ISM band). A limiting amplifier (27) is located at the output of the Source to maintain a constant signal level to the transmitting path.

The source (16) output is used both to provide the transmitted signal and also to drive the Controller's receiving quadrature detector (28) via an amplifier (29) and a directional Coupler (30).

The source (16) output is fed via an isolator (31) to prevent downstream reflections being fed back to the source (16), from the amplitude modulation modulator (32).

The amplitude modulator (32) is driven by a 2.048 MHz pulse code modulation derived from the operating logic unit (33). This pulse frequency is the CCITT standard for pulse code modulation in telephone and data applications.

The amplitude modulator (32) output is fed via a booster amplifier (34) and band pass filter (35) to the transmit antenna (26).

The power is fed to the transmit antenna (26) via a power splitter (36) and 180 degree delay line (37).

The transmit antenna (26) radiates the transmitted signal in a pattern determined by the antenna design. Antenna patterns are selected to optimise particular operating situations.

To Receive by the Communicator

Referring to FIG. 7, signals are received by both antennas (54) and (55) which are monostatic (physically co-incident).

The signal received by antenna (54) is fed via the 90 degree delay line (56) and the quadrature polarisation changeover switch (59) to the antenna (55).

Simultaneously the signal received by antenna (55) is fed in the opposite direction via the quadrature polarisation changeover switch (59) and the 90 degree delay line (56) to the antenna (54).

The two oppositely travelling signals from each antenna interact with each other to produce a composite signal at the points K1 and K2 at opposite ends of the 90 degree delay line (56). This composite signal is detected by the two detector diodes (57) and (58) whose output is summed to produce a net detected amplitude that is independent of standing wave ratio.

FIGS. 8 and 9 provide a more detailed description of the Communicator operation which is described as follows.

Antenna circuitry (61) illustrates the connections of the quadrature polarisation changeover switch (59) (FIG. 4), consisting of GaAs devices (62), diodes (57) and (58) capacitors (63) and inductors (64) of which capacitors (63) and inductors (64) comprise the 90 degree delay line (56).

As described in the FIG. 4 description above, the composite signal is detected by the two detector diodes (57) and (58) whose output is summed by the low noise summing amplifier (65) to produce a net detected signal amplitude that is independent of standing wave ratio.

The output of low noise summing amplifier (65) is filtered by bandpass filter (66) and the logic high and logic low conditions are determined by comparitors (67) and (68) for processing by the operating logic unit (60). The demodulated signal processed by the Communicator operating logic (60) contains a self clocked code comprising clock, framework and data which is used to reconstruct the message.

The Communicator operating logic unit (60) output drives the various input/output devices including the CODEC for microphone and loudspeaker units, the transaction logic device/s, keyboard, displays, audio outputs etc. The functions of the Communicator logic unit (60) relating to acquisition, polling and arbitration, are described under MULTIPLE COMMUNICATOR ACQUISITION FLOW CHART, FIG. 12 and MULTIPLE CONTROLLER ARBITRATION FLOWCHART, FIG. 13.

The operating Logic also dispatches and manages messages to the various peripherals, e.g. keyboard, display, Smartcard, memory etc.

To Re-Radiate from the Communicator

The Communicator operating logic unit (60) converts outputs of the input/output devices listed above into a 2.045 MHz rate, Frequency Shift Keyed (FSK) signal that is fed via driver amplifier (69) to the GaAs devices (62) that comprise the quadrature polarisation changeover switch (59) which performs the modular function in the Communicator.

The preferred modulator design is bi-directional which provides Controller/Communicator antenna orientation insensitivity when using linear cross polarisation of the antennas.

The bi-directional characteristic is achieved by the quadrature polarisation changeover switch (59) which provides for the interconnection of the orthogonal antenna feed points of the patch antenna (70), FIG. 5, to enable sequential, alternating connection of each of the two pairs of adjacent antenna feed points.

An echo and crosstalk cancellation circuit (51) takes output from the transmit line via directional coupler (52) and via a combination of power splitters, mixers, hybrids, delay lines and integrators to create an echo and crosstalk cancellation signal which is injected into the receiving signal path via directional coupler (53).

Inversion and non-inversion of the circuit paths determines the phase modulation of the re-radiated signal and may be zero or 180 degrees The orthogonal interconnection of the quadrature polarisation changeover switch (59) results in the re-radiated signal being of an orthogonal polarisation to that received by the Communicator. This signal becomes the outgoing radiation (re-radiation) of the Communicator.

Referring to FIG. 8, the re-radiating circuit and component assembly is formed by assembling the active components onto a single sub-structure (71) diodes, GaAs devices, inductors, capacitors, leads, etc. to which are connected the four pre-formed transmission lines (72).

The single sub-structure (71) is placed on the ground plane assembly (73) which incorporates a first dielectric layer (74). The patch antenna (70) is incorporated into the second dielectric layer (75) with preformed feed through holes (76) for the transmission lines (72) and is placed over ground plane assembly (73) now holding the single sub-structure (71) and the combined units laminated together.

Electrical connection of the transmission lines (72) to the patch (70) is made by electroplating, soldering, welding or other appropriate means.

To Receive By The Controller

Referring to FIG. 6, the re-radiated energy from Communicators is received by receiving antenna (38) whose output is fed via a power splitter (39) and 180 degree delay line (40), band pass filter (41), preamplifier (42) to amplitude inversion device (43) which compensates the amplitude modulation imposed on the originating Controller transmission at modulator (32) to result in a signal clear of amplitude modulation.

The output of the amplitude inversion device (43) is fed via a quadrature hybrid (44) to the quadrature detector (28).

The output of the quadrature detector (28) is fed to a quadrature summing amplifier (45) which sums in quadrature the in-phase (I) and quadrature phase (Q) outputs of the quadrature detector (28).

The output of the quadrature summing amplifier is fed to Frequency Shift Keyed demodulator (46) which separates the logic high and logic low components through log detectors (47) and (48) which feed sum and difference amplifiers (49) and (50) whose output determines signal polarity (P), signal high to signal low ratio (D) (for data collision detection) and minimum signal level (S) and actual signal level (L). The latter four outputs are fed into the operating logic unit (33) which processes the data.

Signal level (L) in digitised form is used for a number of applications in which choices are made based on signal level. Signal level (L) in digital form may also be passed back to Communicators to facilitate such functions as selection arbitration and tracking.

The output (P) is a three level output such that small differences (D) in the log detector output are registered as data collision.

The Controller operating logic unit (33) output drives the various input/output devices including the CODEC for the phone line, the transaction logic devices, keyboard, displays, audio outputs etc.

The Controller operating Logic (33) works in harmony with the Communicator operating Logic. The functions of the Controller logic unit (33) are described under MULTIPLE COMMUNICATOR ACQUISITION FLOW CHART, FIG. 12 and MULTIPLE CONTROLLER ARBITRATION FLOWCHART, FIG. 13.

Coherent Detection using the same signal reference for the transmitted and received signal provides enhanced system performance. The preferred method is to use Homodyne detection circuits which have particular benefits when the carrier frequency is changing either through instability or intentionally by such methods as spread spectrum, as is shown in FIG. 6A.

A limiting amplifier can be used in the Communicator to control the re-radiated power and also to contribute to the removal of the amplitude modulated components in the received carrier. The limiting amplifier provides a high isolation between receive and transmit circuits minimising feedback. The limiting amplifier also provides the necessary signal level to drive a mixer type detector having a linear law detection function which provides a higher detection sensitivity than is obtained from a square law detector.

The modulation of the re-transmission of the signal received from the Controller by the Communicator is either Single Sideband or Double Sideband to provide feedback isolation.

The detector output level can be made independent of the relative orientation of cross polarised antennas by placing a single detector diode away from a point on the interconnection between the two cross polarised antennas which is an equal phase distance from each antenna, as is shown in FIG. 6B. For orientation insensitive output at the detector:

$$l_d = \lambda/8 + n\lambda/2$$

In this way the travelling waves from both antennas always add in quadrature at $l = l_d$.

The preferred Modulation and Scheme is shown in FIG. 10.

Controller Transmit Signal Architecture

The source frequency signal (77) is located in the 2.45 GHz ISM band The source frequency may be selected in this band to reduce adjacent controller interference.

Spread spectrum modulation of the source signal is produced by a phase reversal modulation (78). Various coding systems may be used such Manchester and Miller (Non Return to Zero, NRZ), and Return to Zero (RZ) Codes with either amplitude or frequency modulation.

The preferred coding system (82) utilising amplitude modulation (79) is based on a three zone bit coding (83) in which the first zone period (84) of the three periods is always 100% modulated, the second zone period (85) provides the varying bit information (varying between approximately 50% and 100% modulation) and the third zone (quiet) period (86) which is maintained at the approximate 50% modulation level to be available for re-modulation.

An exception to the above bit zone period levels pattern received by Communicators occurs when the third zone bit period is zero level or close to zero level. This results from a bit collision i.e. a logic one and a logic zero which in turn results from the Controller's response to receiving bits in time co-incidence from several Communicators attempting to be acquired by the Controller.

This information is used by the Communicator to re-send the last bit sent, given that the bit previous to the last bit sent was of the correct sense; otherwise the Communicator ceases to respond to the Controller until the next call for acquisition.

A missing first zone period edge (87) is utilised to signify such functions as a frame bit for synchronisation purposes.

This coding forms the basis on which voice/data modulation (80) takes place

The preferred Voice Signal/Data modulation (79) of the spread spectrum modulated source signal is achieved by amplitude modulation (nominally 50%).

The modulation sources DATA IN and VOICE IN are connected directly and via the CODE$_C$ respectively to become the input to the amplitude modulator.

In designing the system either amplitude or frequency modulation may be used; amplitude modulation is preferred.

The amplitude modulation of the Controller transmitted signal is preferably kept to modulation percentages below 50% to ensure the Communicator receives sufficient continuous signal during the negative modulation periods to allow sufficient carrier level for remodulation of the received signal by the Communicator.

Care must be taken to isolate the receiver/transmitter of the Controller to prevent amplitude modulation breakthrough to the Receiver demodulator.

Amplitude modulation simplifies the signal demodulation in the Communicator.

Frequency modulation of the Controller transmitted signal creates additional complexity in the Communicator demodulator in which a resonator or long delay line might be used.

It is essential for the Controller Demodulator to use part of the frequency modulated signal as its frequency reference to ensure orthogonality(spread spectrum principle).

The radiated signal (81) is preferably vertically polarised.

The radiated signal can alternatively be horizontally polarised or left or right circularly polarised.

Whichever polarisation method is applied, the signal polarisation received by the Controller from the Communicator is required to be orthogonal to the Controller transmitted signal.

Horizontal polarisation is orthogonal to vertical polarisation.

Left circular polarisation is orthogonal to right circular polarisation.

Communicator (Return) Signal Architecture

The signal from the Controller is received (89) by the Communicator's cross polarised antennas (54) and (55) whose resolved components are vectorially summed and detected (90) to provide the received voice/data information.

Multiplexed voice information (91) is available as 2.045 MHz PCM signal to the CODEC (VOICE OUT) and together with the digital data is available for further processing.

Communicator Re-Radiated Signal Architecture

Multiplexed voice information (92) (VOICE IN) which is available as 2.045 MHz PCM signal and the digitised data (DATA IN) return information are in combination used to generate a Frequency Shift Keyed signal (93) which in turn delay modulates (94) the signal energy to be re-radiated by the Communicator.

The re-modulation may be amplitude modulation phase modulation or delay modulation.

The preferred modulation method is delay modulation which may be implemented using fast solid state (Galium Arsenide) switches and fixed delay lines (½ wavelength or 180 degrees nominal).

Since in the preferred Controller modulation scheme, carrier is continuously transmitted to Communicators, isolation of Controller transmit and Communicator re-radiate signals is achieved by frequency separations of signals in either direction.

The signals from the Controller are transmitted as DC pulses at a 2.045 MHz rate. To provide the necessary isolation, the signals from the Communicator are transmitted as 8.192 MHz (2.045*4) for logic zero and 12.288 MHZ (2.048*6) for logic one at a 2.045 MHz rate co-incident with the incoming signal received by the Communicator.

This approach saves the need for additional synchronising circuitry in both Controller and Communicator.

The re-modulation of the received carrier by the Communicator can either be a range of harmonics providing appropriate logic zero and logic one separation as in the preferred implementation or sub-harmonics providing appropriate logic zero and logic one separations in the detected modulation from the Controller. The latter case is applied to systems where the reply data rate by the Communicator is less than the receive data rate by the Communicator.

The following FSK frequency ratios (Note 3) are used to achieve send and return isolation in the preferred implementation:

ONE = 6*Detected modulation frequency

ZERO = 4*Detected modulation frequency, within each Communicator return bit being sent during a full Controller bit period (84)+(85)+(86). The final signal (95) is FSK modulation on phase modulation on amplitude modulation on spread spectrum signal the amplitude modulation and spread spectrum components being carried forward from the initiating Controller transmitted signal.

The polarisation of the final signal (95) to be re-radiated is orthogonal to the signal received from whose energy it is derived.

Controller Received Signal Architecture

The signal received from the Communicator (96) is orthogonal to the single initially transmitted from the Controller.

The signal received from the Communicator (96) is demodulated by the quadrature detector (97). The demodulated signal is then FSK demodulated (98) to derive the digital data and PCM voice data. The final voice data is then derived from the CODEC (99).

The Data Block Definition is shown in FIG. 11. A "Data Block" is defined as the sequence of data words from the beginning of one frame word to the beginning of the next frame word.

The preferred implementation of the Data Block provides for thirty two words of eight bits each.

The first word is the frame word.

The second word facilitates the lower priority activities listed in the FIG. 8.

The sixteenth word facilitates signalling and transactions for telephone applications.

The remaining words are assigned to specific Communicators in a sequential polling basis.

The two-way communication interchange of the system can be any one of Full Duplex, Half Duplex and Quasi Full Duplex. When the Quasi Full Duplex interchange is used, bits are sent and received in alternate intervals allowing the receiver to recover from any transient interference and improving the isolation between the controller transmitter and receiver. This is shown in FIG. 11B.

The two-way transmissions can be made by a number of mediums including cable, waveguide or other such bounded or guided medium. The process of Communicator acquisition by Controllers is shown in FIG. 12. In the preferred implementation if a Communicator re-radiates a reply which when received by the Controller coincides with a reply from another, as yet un-acquired, competing Communicator, then a reply collision is identified at the Controller (simultaneous logic one and logic zero).

The Controller will then determine which of the competing bits of the acquisition word is the highest amplitude and continue 'handshaking' with the bits having the highest amplitude until acquisition is completed with a single Communicator and it is allocated its polling word position. During this process Communicators not fitting the bit pattern are signalled to cease responding until the next acquisition search commences.

Once a Communicator is identified and acquired, it is informed and if it so signals its intention to communicate, it is given a polling position in the polling sequence on which it will conduct its business until completed Otherwise it is given a sequence number in the data acquisition word.

Upon completion of a transaction the Communicator may be deactivated and limitations placed on re-acquisition subject to specified time and data criteria.

Generally transactions may carry both Controller and Communicator identifications regularly throughout the message streams to ensure link integrity.

In some cases it may be desired to pass a dynamic convolutional code back to the Controller to defeat the possible eavesdropper. An eavesdropper may be able to hear the Controller, but certainly not the Communicator. The process of Multiple Controller Arbitration is shown in FIG. 13. In the event that a Communicator receives multiple Controllers then the Communicator operating logic arbitrates to establish a link with the Controller providing the strongest signal as determined by the signal level reports received from the Controllers. Once a transaction link is established between a Communicator and a Controller it will be maintained until completion of reduction of signal level below a predetermined threshold level resulting from change of location by the user, even though higher signal level Controllers are received.

At the threshold level, and before a transaction is prematurely terminated, the operating Logic will generate a warning signal to the Communicator user who will have the options of maintaining proximity to the transacting Controller until the transaction is finished, terminating the transaction prematurely, or signalling the other transaction party to 'hold' the transaction while a new connection is established via another, more favorably located Controller.

A range of antennas may be used for both the Controller and Communicator, including phased arrays, lens and patch designs.

The patch antenna design is preferred for its simplicity, ease of achieving cross polarisation, its low dimensional profile and flexibility in construction methods. Either linear or circular polarisation may be used. Circular polarisation involves increased circuitry.

Whatever polarisation is used, the receive and transmit antennas must be isolated, preferably by orthognality. This may be achieved by cross polarisation.

The following schemes describe methods of applying each of these options to ensure effective communication between Controllers and Communicators for any relative orientation of antennas.

Circular Polarisation

For circular polarisation the Controller transmitting antenna (26) and the Communicator receiving antenna (54) and (55) must be the same polarisation unless a bi-directional modulator is used in the Communicator.

Linear Polarisation

For linear polarisation either all the antennas must be of the same polarisation such as vertical or horizontal or alternatively as preferred, both pairs of Controller transmit (26) and Controller receive (38) antennas and Communicator receive and Communicator transmit antennas (54) and (55) must be cross polarised. Independence of relative orientation between Controller antennas (26) and (38) and Communicator antennas (54) and (55) can be achieved when the Communicator modulator is bi-directional and the antennas are cross polarised.

Cross Polarisation of Antennas

It is preferred that the Communicator antennas be monostatic and cross-polarised.

It is preferred that the Controller receive antenna (38) be cross-polarised to the Controller transmit antenna (26) and may be monostatic with it.

Increased range may be achieved by ensuring high isolation between the Communicator antennas and using an appropriate high frequency amplifier such as a Galium Arsenide device, and/or, pulse operation of the Controller (50% duty cycle) with delay provided by the Communicator equal to the transmit pulse width of the Controller by adding a delay line in the Communicator between its two antennas equal to a bit period so that transmit and receive cycles at the Controller may be alternated using a Transmit/Receive switch. In addition, range may be increased by increasing Controller power, increasing antenna gain on either or both Controller and Communicator, increasing receiver amplification and decreasing noise figure, decreasing system bandwidth, and improving overall processing efficiency.

Receiving Amplitude Modulation From Controller

Both Communicator antennas are used in the receive mode using two quadrature diode detectors. The Detectors (57) and (58) shown in FIG. 7 operate as power detectors in their normal operating range below $-10$ dbm. The detectors are located 90 degrees apart at the Controller carrier frequency on the transmission line between the two antennas in the Communicator. The circuit is made standing wave independent by summing the voltage outputs of detectors (57) and (58).

The reason this circuit is independent of standing waves is as follows

NETT POWER $= P1 + P2$ since V1 is proportional to P1, square law region, then, NETT POWER is proportional to $V1 + V2$ and therefore by summing V1 & V2 the system is now standing wave independent.

Receiving Frequency or Delay Modulation from Controller

Since the Communicator has no local oscillator, demodulation is accomplished using the edge of a resonator (where phase shift is high) or using a delay line.

In the case of the resonator solution the centre frequency is set to the 3 db point of the resonator.

In the case of the delay line solution two delay lines are used connecting each antenna with the demodulator.

Since the carrier phase at the Controller quadrature demodulator depends on the range of the Communicator then there is no guarantee that the Controller source signal component used as a local oscillator feeding the detector circuit will be in phase with the received carrier (re-radiated from the Communicator). Therefore demodulation must be achieved in an image rejection mixer, a quadrature detector or an offset local oscillator detector. Since we are dealing with one reflected carrier at a time, hard clipping at the demodulator is allowed Referring to FIG. 6, it is preferred for high isolation to provide a cancellation circuit (51) to null out Transmitter crosstalk and echos from the Controller transmitter. This requires control of the amplitude and phase shift of the nulling/cancellation signal to the receiver coupler (53).

A long averaging time for the cancellation circuit (51) is required in order to smooth out short term fluctuations. The control signal for the cancellation comes from the quadrature detector (28) output which must be nulled by the appropriate phase and amplitude of the cancellation signal.

As shown in FIG. 15 the Controller consists of a box-like assembly with the transmit/receive antennas co-planor mounted on the box side from which the transmission emanates.

For outdoor applications the antennas will generally be covered with a protective radome. The power source, modulator, demodulator, amplifiers and operating logic associated with the Controller operation are contained within the box.

Depending on overall system design, where distributed processing is desired, additional processing circuitry may be included in the Controller assembly.

FIG. 16 shows a configuration of a Communicator for use as a portable telephone/transaction device in all its transaction modes. The unique feature is a folding and/or tilting antenna assembly which enables the antenna to point towards the overhead located Controller. A further desirable feature is provided in folding the microphone/loudspeaker/keyboard/display structure to provide a pocket-size unit. The Communicator is designed to operate in several different physical and electrical modes; these include:

Completely folded FIG. 17—inactive or when activated and facing towards Controller, listening and acknowledging (advises user when a call is waiting, or advising of messages) Partially folded, antenna extended, facing upwards FIG. 18—listening and acknowledging (advises user when a call is waiting, or advising of messages).

Controllers may be linked to form a local area control network as shown in FIG. 14.

The functions of Controllers and Communicators generally remain as previously described. The local area network control equipment provides a means of: (1) interconnecting Controllers to enable Controller/Communicator transactions to be transferred from one Controller to another during the transaction period; (2) Communicators communicating with other Communicators within the local area network; (3) Communicators to become an extension of PABX's; (4) Communicators to communicate with public telephone lines; (5) Communicators to be communicated with by appropriate devices outside the local area network control equipment; and (6) Communicators to be linked to transaction processors outside existing telephone systems.

A full system self check can be achieved by providing a Communicator in the Controller's transmitted signal beam that is known to the Controller and may be activated by the Controller to verify the communication link integrity.

Encryption of the Controller transmitted and Communicator re-radiated signals can be achieved by a number of methods including Public Key encryption which for example allows the signal to be encoded by a Communicator with only appropriate, approved institutions (banks etc) having the facility to decrypt the signal.

A convoluted code can be used between a Controller and Communicator based on a known Maximum Length Sequence (M - Sequence) and, in particular, an M- Sequence in which the two ends of the communications link are constantly changing keys.

Since the quadrature detector in the Controller measures the instantaneous phase of the re-radiated reply from the Communicator, then the measurement of change of phase will indicate motion and the rate of change of phase will indicate the radial velocity.

The delay modulation of the re-radiated energy of the Communicator can be achieved either by double sideband or single sideband modulation. The preferred method is double sideband modulation.

Single sideband modulation may be achieved by using an image reject mixer and selecting the appropriate upper or lower sideband.

Single sideband modulation has the advantage that it allows independent replies on the separate channels created by the upper and lower sidebands.

In situations where the distance separation between Communicator and Controller is such that the signal level received back at the Controller from the Communicator is too low for effective operation, the received and re-transmitted signal at the Communicator end and the two way link can be increased by the use of an amplifier in the return signal path.

The isolation between the two cross polarised components of the receive and transmit signals is enhanced by the modulator which shifts the frequency in the feedback path.

There are several means of achieving the required amplification.

Method 1

The first utilises a combination of a 90 degree hybrid coupler and power splitter. As shown in FIG. 19 the right polarised received signal is received by the two Communicator antennas which are linear cross polarised.

The received signal then passes through the 90 degree hybrid coupler/power splitter and passes through the input limiting amplifier which can have a typical gain of 30 db.

The right polarised received signal then splits into 2 paths. The first path leads to the detector which detects the received modulation. The second path leads to the phase modulator which remodulates the received signal with the outgoing message. The modulator can either double sideband or single sideband modulate the outgoing, reflected signal.

Image reject mixing is used to achieve single sideband modulation.

The outgoing signal then passes through the 90 degree hybrid coupler power splitter through to the antenna for transmission back to the Controller. By entering the alternate part of the hybrid the re-transmitted signal becomes left circular polarised.

The directions of circular polarisation may be reversed.

Method 2

In this solution the two Communicator antennas may be linear or circular cross polarised and may be monostatic or bistatic.

The dual receiving, amplifying, circulating and modulating circuits are connected in a symmetrical bridge form as shown in FIG. 20.

The received signal passes from the two antennas through each circulator whose circulating direction is the same when viewed from the limiting amplifier. The output from each circulator splits, one part passing to the connected detector and the other part passing through the connected dual or single sideband modulator, then on to the other circulator and on to the antennas for re-radiation back to the Controller.

Method 3

In this solution the two Communicator antennas may also be linear or circular cross polarised and may be monostatic or bistatic.

The dual receiving, hybrid amplifying and modulating circuits are connected in a symmetrical bridge form as shown in FIG. 21.

The received signal passes from the two antennas into each of two 90 degree coupler/power hybrids. The output from each hybrid splits, one part passing to the connected detector and the other part passing through the connected dual or single sideband modulators, then on to each of the other hybrids and on to the antennas for re-radiation back to the Controller.

Range Timing Compensation

As the range increases the relative timing of the return code pulses will change until send and receive bit signals no longer occur within the transmit bit period at the Controller causing synchronising and timing problems.

Timing compensation is provided for changing ranges between Communicators and Controllers by determining the range of each Communicator from a particular Controller by measuring the time delay between transmitted and received signals at the Controller. The range is determined by sending a single one bit tone burst (i.e. one) measuring bit, from the Controller in synchronism with the beginning of the frame sync word.

The Controller measures the time interval between transmitted and received measuring bit and reports this time interval to each individual Communicator. Each Communicator then introduces a delay into its return data calculated to ensure that all its replies arrive in the correct time slot at the Controller.

By providing 256 successive frames, one for each Communicator, it is simple to monitor and track the movement of each communicator in real time. An update rate for range reports of 32 times a second is considered adequate since no communicators normally respond during the frame word period. This update rate will provide tracking out to a Controller/Communicator range of 600 meters.

If longer ranges such as 1200 meters are required the control/command word can also be used to double the reply interval to update range.

Any delay longer than the pre-determined compensation period will result in data collisions in the active data slots.

The range compensation is to be applied by determining the time delay corresponding to the longest Controller to Communicator back to Controller transmit and receive paths and providing a positive or negative timing offset (depending on the frame reference point used) in all communicators equal to this maximum delay for the minimum range situation. As the range increases the Communicator, based on the range information provided by the Controller, will calculate the timing offset required to cancel the range delay caused by its distance from the Controller and automatically adjust the delay of its return signals to provide continuing accurate synchronisation of the return signals at the Controller.

The basic CEDCOM TM Microwave Automatic Transaction System, C-MATS, operates on the principle of an electro-magnetic two way signal exchange in which the signal power is generated at only one end of the two way link by a signal generating transmitter/receiver unit called a Controller.

The other end of the two way link, which does not generate an electro-magnetic signal of its own, providing return signals by re-radiating its received energy, is a personally portable signal receiver/re-radiator transaction unit called a Communicator.

The signals between the Controller and the Communicator are appropriately modulated to produce digital and/or analogue outputs at the Controller and Communicator.

These outputs provide the data signals to enable data communication to take place in both directions either simultaneously or sequentially.

The Communicators do not of themselves generate electro-magnetic signals but receive signals generated by Controllers from which relevant data is obtained. The Communicators re-radiate the electromagnetic energy received from Controllers which energy is modulated by data generated by the Communicator and received by Controllers using a technique similar to modulated backscatter radiation.

Information of the basic principles of modulated backscatter radiation is in the public domain.

C-MATS utilises a principle similar to modulated backscatter in a unique configuration and design to create a new form of 'wireless' transaction system.

As shown in FIG. 3, each Controller (1) radiates low power signals into local designated areas. Calls can only be made or received by an individual Communicator (2) when located in a local designated area and when its received signal level is high enough for its operation.

Controller antennas may operate in any plane, but it will be most effective system-wise if common radiating directions are used for common system applications so that users of Communicators can use a standard presentation or direction of their Communicator antennas.

Controllers will generally be positioned above the locally designated areas in which Communicators can operate, with their antennas radiating downwards so that their signal radiation is normal to horizontally orientated Communicator antennas positioned beneath them.

The frequency on which each communication takes place is determined by each Controller and given that the radiation from each Controller is limited to its immediate vicinity, then the only limitation on the number of Communicators which may operate at any one time world-wide is that number of Controllers installed and the telephone lines or communication channels allocated to each.

The system is not limited by radiated signal channel space. The system operates at a frequency of 2.45 Ghz in the microwave spectrum and is only limited by the number of Controllers installed.

The Communicator/Controller combination provide a means of conducting two way transactions. Amongst other applications, a transaction capability allows a secure identification and data transaction to take place such as a financial transaction.

The Communicator includes a processor and interface to the CP8 'Smartcard' to provide the security, storage and processing of transactions.

Provided sufficient telephone lines or channels are connected to a Controller, then any number of Communicators up to the number of lines or channels available may simultaneously be in communication via each individual Controller up to the designed channel capacity of the Controller.

As illustrated in FIG. 3, in operation a person carrying a Communicator is able to initiate or receive calls to process a transaction when they are within the illuminated zone of a Controller and their Communicator indicates 'communicate ready' by establishing that an appropriate signal level exists and by transacting an exchange of identifications between Communicator and Controller and being allotted a polling slot or placed in a waiting sequence.

To initiate a transaction the Communicator may be accessed by a secret PIN or some other transaction approving action which is keyed to activate a transaction in the CP8 Smartcard.

Transactions may be made using the Telephone Network. Once acquisition is achieved between a Controller and Communicator, providing appropriate provisions are made in the Controller, the telephone number required is then dialed in the conventional manner.

When connection is made, transactions can proceed.

The Communicator is 'passive' in the signal generation sense, receiving the signal energy from the Controller, processing the received signal message and re-radiating the received signal energy from the Controller which is modulated with the return signal message back to the Controller utilising a 'backscatter' technique.

Logic circuitry and software 'lock' each Communicator into its presently communicating Controller.

Given the directivity of the Communicator antenna and the low signal levels used, eavesdropping is extremely difficult. Given the directive patterns of both Communicator and Controller antennas, any eavesdropping device used needs to be physically located between the Communicator and Controller to receive both signals.

Conventional public access or other appropriate method of encryption can be used to provide desired levels of secure communication.

FIG. 5 provides an overview of the system operation. The Controller (1) contains a Source (2) which generates the electro-magnetic signal, the Operating Logic unit (3) receives voice and/or data from an external source and provides an appropriate input to the Modulator (4) which modulates the electro-magnetic signal with voice and/or data which is then radiated via the transmitting Antenna (5).

The Communicator (6) receives the electromagnetic signal transmitted by the Controller via its receiving Antenna (7) and (12). The received signal splits into two paths. The first path is to the Demodulator (8) where it is demodulated and the output is connected to the Operating Logic unit (9) which processes the received, demodulated voice/data signal which is provided as input to an appropriate Transaction Logic (10) and peripherals.

To provide a return communication, voice and/or data from the Transaction Logic (10) is connected to the logic unit that drives the Modulator (11) which modulates the signal received from the Controller (1) this modified signal is than fed to the transmitting Antennas (7) and (12) and re-radiates the return signal back to the Controller (1).

The Controller (1) receives the 'backscattered' signal from the Communicator via receiving Antenna (13). This signal is detected by the Demodulator (14) which uses part of the signal from the Source (2) as a reference in its detection process. The demodulated signal is fed to the Operating Logic Unit (3) from which it is connected to the Transaction Logic (15) in turn connected to external processing and communications circuitry.

The Controller transmit (5) and receiver (13) antennas may be integrated into the one antenna structure as may also be the Communicator receive and re-radiate antennas (7) and (12).

The basic C-MATS Microwave Automatic Transaction System consists of a portable microwave link terminal called a Transflector TM with a preferred capacity of up to 64 Kbps full duplex transmission with a fixed microwave station called a Microplexor TM operating at a preferred 2.045 Mbps.

Each Microplexor is capable of simultaneous, full duplex data interchange with a number of Transflectors, the number being determined by the data rates of the individual Transflectors, e.g. 1 Transflector at 2.045 Mbps, 30 Transflectors at 64 Kbps, or 240 Transflectors at 8 Kbps.

Described below is a network system in which Transflectors can communicate through a network consisting of hierarchies of progressively increased capacity data busses. The network also provides the means whereby a moving Transflector, while in the process of a transaction, can be passed onto other Microplexors as its movement takes it out of the operating range of the communicating Microplexor. The arbitration as to which of several Microplexors, whose signals are being received by a single Transflector, is the connected Microplexor, is determined by the Transflector.

The network described below also provides the basis for an international, personal Transflector identification number which is tracked location-wise to enable connections to be made via the personal Transflector number regardless of the location of the Transflector or the location of caller (Transflector or other party).

Also described below are ancilliary networking facilities which enhance the functionality of the network.

The network has a pyramidical structure in each national application. The number of 'pyramid' levels is determined by both geographical dispersion of Microplexors and the number of Transflectors.

LEVEL SM—Single Microplexor

The Single Microplexor level takes the for shown in FIG. 22. It can be seen that a nominated number of channel connections may be made through the Microplexor.

Transflectors in the communication zone of the Microplexor will automatically be assigned channels until all channels are occupied. At that time Transflectors unable to be allocated a channel will be placed in a hold queue until a channel can be allocated.

Level SM provides an aggregate data frame capacity of 2.045 Mbps.

LEVEL MM

The Multiplexor level is used where the 2.045 Mbps data frame capacity will not be accessed in a single Microplexor communication zone. In this case the 2.045 Mbps data frame capacity is shared by several Microplexors on a shared time division basis.

At this level one of the Microplexors is selected/fitted as the Controlling Microplexor, FIG. 23, interlacing the data streams from each connected Microplexor (including its own datastream) to provide a nominated number of channels to the external network world.

The Controlling Microplexor continually monitors the call load on each of the controlled Microplexors and actively allocates frame space between Microplexors based on relative loadings.

Where Microplexors are physically positioned so as to provide overlapping Communication Zones, FIG. 24, a channel transfer message processor in the Controlling Microplexor will automatically transfer a transaction data stream from a Microplexor whose signal level is falling to below acceptance threshold (i.e. the minimum signal level received by the transflector which provides reliable full duplex operation), to the Microplexor providing the highest above-threshold signal level to the Transflector. FIG. 24 also shows how the communication zones of Microplexors are physically located to provide continuous coverage by overlap of adjacent channel signals while ensuring physical separation between the coverage of duplicated channel signals, e.g. A and A shown in FIG. 24.

By the above means a moving Transflector can maintain a reliable, fully duplex data transfer connection to an outside channel.

The Controlling Microplexor contains an active database record of each Transflector in the total zones of base Communication of itself and each controlled Microplexor. This data base is automatically interrogated each time a new connection is requested by a Transflector, where the number of the Transflector called is in the active database. The connection is made directly to the called Transflector via the Controlling Microplexor without loading up the network external to the Controlling Microplexor.

Each active database may be divided into three segments: the first segment is the register of Transflectors registered to a particular channel node; e.g., Level AN. The second database segment contains a register of 'travelling', locally registered, Transflectors. This register segment is updated by forwarding the 'address' of each travelling Transflector each time it first connects to a distant Microplexor as a 'visitor', to enable a re-direction of calls. The third database segment contains a register of 'visiting' Transflectors which are registered elsewhere. This register is interrogated by a calling Transflector and if the called Transflector is in this database segment, then a direct connection between the two is made.

Active database may be installed at any level subject to capacity and any operational requirements of the system manager.

Each Microplexor/Controlling Microplexor contains a call register/processor which determines whether a charge is made or not. If a charge is made, then the charging mechanism is either through the billing process of the external network, or if a 'Smartcard' like function is used in the Transflector, funds transfer is made during the progression of the Transflector/Microplexor (and any external) connection at rates determined by the Microplexor.

LEVEL AN—Area Node

This level operates at a suitable multiple of the Microplexor frame rate. A possible multiple might be 20 times, e.g. at 40.96 Mbps.

To access the AN level, Microplexors and Controlling Microplexors (whichever are connected to the AN Level) are fitted with a frame compression facility. The frame compression facility consists of a data buffer which receives each Frame sequence at a 2.045 Mbps rate and a processor which retransmits the Frame sequence at a 40.96 Mbps rate.

This 'compressed' data sequence is then positioned in the 40.96 Mbps rate frame by an Area Node Controller to which an appropriate number of Microplexors/Controlling Microplexors are connected.

Area Node Controllers may be fitted with similar functionalities as the Microplexors, e.g. each Area Node Controller contains an active database record of each Transflector in its total zones of Communication and each controlled Microplexor/Controlling Microplexor. This database is automatically interrogated each time a new connection is requested by a Transflector. Where the number of the Transflector called is in the active database, the connection is made directly to the called Transflector via the Microplexor without loading up the network external to the Area Node Controller.

The Area/Node Controller may also contain a call register/processor which determines whether a charge is made or not. If a charge is made, then the charging mechanism is either through the billing process of the external network, or if a 'Smartcard' like function is used in the Transflector, funds transfer is made during the progression of the Transflector/Area Node Controller (and any external) connection at rates controlled by the Microplexor.

LEVEL ZN—Zone Node

The level is a higher level ZN 'pyramid' structure working at a frame speed multiple of the Area Node Controller Node speed.

This level is controlled by a Zone Node Controller having similar functions to an Area Node Controller.

LEVELS FN—Further Levels

Further levels may be provided, each level operating at a frame speed which is a multiple of the Controller frame speeds immediately below the controlled level in the network 'pyramid'.

Any particular level may be connected via an appropriate interface to existing telephone and data networks.

FIG. 25 provides a representation of how various system levels are connected.

A Transflector leaving its 'home' registered level database, is automatically registered as a Visitor at the 'visited' location which in turn advises the Traveller's home database of its then present location. The home database then registers the Transflector as a 'traveller' together with the forwarding address.

Each of the database locations may provide an electronic mail message store and forward service.

Path redundancy can be provided by connecting individual Microplexors to several Area Node Controllers, the additional connections providing stand-by paths in the event of a primary path failure.

Similarly, individual Area Node Controllers can be connected to several Zone Node Controllers. This cross linking to provide stand-by paths can be progressed to any desired level up the system hierachy.

While the above system description contemplates a network utilising moving subscribers (the Transflectors) it can be used either separately or in combination with a wired system in which the wired 'plug' outlets become the connectors for portable terminals having the processing functionality of Transflectors but without the radio link.

C-MATS thus provides a "transparent" link between a mobile processor such as a CP8 Smartcard connected to a portable Communicator and the line, input/output of a fixed location Controller.

The system allows both a magnetic stripe card reader to be read into the communicator transaction processor and also a smart card connection to the communicator transaction processor allowing transactions to be made between the C-MATS and the smartcard. These transactions include sending and receiving encrypted messages, reading and up-dating the smart card memory and transferring programs and data.

The detailed performance parameters are as follows:

| Overall System | |
| --- | --- |
| Data Transmission Specification | I. S. D. N. |
| System Data Rate | 2.045 M/baud |
| Radio Transmission Range | 2-50 Meters |
| Coverage per Controller | 10 Square meters (@ 10 mW radiated signal) |
| Controller (basic configuration) | |
| Input/Output Connections | |
| Sync | 8 KHz |
| Clock | 2.048 MHz |
| Data | Serial 2.048 M/baud |
| Microwave Frequency | 2.45 GHz nominal |
| Frequency Channels (basic configuration) | 4 |

(Specific frequency channels are allocated and special separation of Controllers are provided so that during co-incident Controller frame transmissions in multi-controller applications, nearby communicator interference is eliminated.)

| Microwave Radiated Power (basic unit) | 10 mW |
| --- | --- |
| Number of 64 K/baud Channels | 30 max. |
| Number of 8 K/baud Channels | 240 max. |
| Number of Concurrently Active Communicators | 240 max. |
| Number of Active & Innactive/ Monitored Stand-by Communicators | 256 max. |
| Antenna Gain | 8-26 dbi |
| size | 400*400*150 mm |
| Power Requirements (basic unit) | 10 W |
| Data Format | |
| Bit Rate | 2/048 M/baud |
| Frame Length | 256 Bits |
| Frame Period | 125 usec |

Frame Composition (Refer To Diagram 26)

Each Frame consists of:
Bits 0 thru 3—Frame Character
Bits 4 thru 7—Controller ID
Bits 8 thru 15—Command and Control Byte
Bits 16 thru 255—data

Channel Time Division Channel Allocations

Through its command and control function, the Controller processor can allocate the available data bits into Communicator 'polling slots', each of Controller determined bit lengths generally depending on the volume of the transactions occurring between the Controller and individual Communicators.

COMMAND CONTROL

The Command and Control byte segment of each Frame transmission provides the means by which each Controller directs its communication process with Communicators.

The Command and Control functions consists of:
Acquisition Command

Communicator Acquisition is achieved by a process in which the Controller progressively suspends, for later acquisition cycles, Communicators which have not yet been acquired, leaving a single, acquired Communicator at the end of each Acquisition cycle.

The Controller commences the process by issuing an Acquisition command code (bits 8 thru 11) All non-acquired Communicators receiving the Acquisition command respond at Bits 12 with their first Identification Code Bit, either 1 or 0.

The Controller which is capable of sensing simultaneous 1's and 0's, determines the bit of highest signal level, which becomes the first bit accepted This bit type (1 or 0) is then transmitted as a Verification of the bit chosen (as having the highest signal level) in Bit 13 and is compared in each Communicator with the first Identification Code Bit it sent.

If Bit 12 sent by the Communicator and Bit 13 received from the Controller do not match in a Communicator, then its internal logic will instruct it to cease sending its Identification Code until the next Acquisition command is received.

If Bit 12 sent by the Communicator and Bit 13 received from the Controller do match in a Communicator, then its internal logic will instruct it to send its second Identification Code Bit in Bit 14.

The Controller again determines the bit of highest signal level, which becomes the second bit accepted. This bit type (1 or 0) is then transmitted as verification of the bit chosen in Bit 15 and is compared in each of the surviving Communicators with the second Identification Code Bit each has sent.

If Bit 14 sent by the Communicator and Bit 15 received from the Controller do not match in a Communicator, then its internal logic will instruct it to cease sending its Identification Code until the next Acquisition command is received.

If Bit 14 sent by the Communicator and Bit 15 received from the Controller do match in a Communicator, then each surviving Communicators' logic instructs it to suspend transmitting its identification code until it receives the Extension Command (described below) as part of the Acquisition process from the Controller. The Extension Command is the signal for the Communicator to transmit its third Identification Code Bit during the next Frame sequence of that Controller.

Acquisition Extension Command

Refer to TABLE 1.

The Extension Command is issued as a 0 during Bit 8 to instruct all Communicators other than those which have survived verification thus far, to remain silent.

Communicators which have survived verification thus far will send their next Identification Code Bit during Bit 8.

The Controller again determines the bit of highest signal level, which becomes the third bit accepted. This bit type (1 or 0) is then transmitted by the Controller in Bit 9 and is compared in each of the surviving Communicators with the Identification Code Bit each has just sent during Bit 8.

If Bits 8 sent by the Communicator and Bit 9 received from the Controller match in a Communicator, then its internal logic will instruct it to send its next Identification Code Bit in Bit 10.

As described previously, if Bit 8 sent by the Communicator and Bit 9 received from the Controller do not match in a Communicator, then its internal logic will instruct it to cease sending its Identification Code until the next Acquisition command is received.

This process will continue for each succeeding Bit until either the Identification Code is completed and one surviving Communicator remains, or, continues to Bit 14 and Bit 15. As previously, if a match occurs, each surviving Communicator's internal logic will instruct it to suspend transmitting its identification code until the next Frame.

The Acquisition Command takes 8 Frames to capture a Communicator.

Verification Command

The Verification Command is used by the Controller to confirm the identification code of the single Communicator surviving the full sequence of the Acquisition Command Process. The Verification Command is transmitted by the Controller during Bits 8 thru 11 of the Frame Bit Period.

The Controller transmits during Bits 12 thru 15, the first four Identification Code Bits it 'captured'.

The Controller transmits an Extension Command, Bit 8, in each of the next 5 Frames. After each Extension Command it progressively sends the remainder of its Identification Code during Bits 9 through 15 of each Frame.

The process is repeated in subsequent Frames until the full Identification and the Check Sum are sent by the Controller.

If the Check Sum does not match the Identification Code, the Communicator does not reply. This results in the Controller repeating the Verification Command This process will be repeated only once after which the Controller cancels the Acquisition process and starts again.

If the Check sum does match in the corresponding Communicator, the Communicator sends a 2 bit Mode Request followed by a 2 bit Check Sum starting in Bit 11.

The Controller will verify receipt of the Mode Request by sending a 1 in Bit 15.

The Verification Command takes 6 Frames to complete its transaction.

Assign Communicator Password Command

Once Verification is complete, during the next Frame the Controller issues the Assign Communicator Password Command during Bits 8 thru 11 of the Frame Bit period and also issues the Communicator a unique Password, a Signal level message, a 1 bit message indicating whether a Polling Slot Allocation has been made or it is in the Queue, and either a Polling Slot position or initial queue position.

The Communicator sends a one for one bit verification reply and if this matches the total message sent by the Controller, the Controller confirms the transaction by sending a 1 in Bit 14 of the 4th Frame. The Communicator sends a 1 in Bit 15 confirming receipt of the Controller's confirmation.

Each Password consists of a total of 8 Bits. The first 5 Bits determine the Group Number (1 to 32) of that group of 8 Passwords and next 3 Bits define which of Bits 8 thru 15 will represent the status of the Communicator.

This data is transmitted during Bits 12 thru 15 of the first Frame and continued during Bits 9 through 15 of subsequent Frames via Extension Commands. Since the data is going from the Controller, Bit 8 is not available for data since it is used to signal the Extension.

The Communicator verifies its allotted Password, signal level and Polling/queue positions by repeating each Bit received from the Controller during each Frame Bit Period (carrying over from Frame to Frame in which the repeat of Bit 15 is sent during Bit 9 of the subsequent Frame).

Assign Polling Slot Command

As Polling Slots become available the Controller assigns these to each inactive Communicator in the order in which they were acquired. The assignment is achieved by the Controller issuing the Assign Polling Slot Command during Bits 8 through 11 of the first Frame, followed by the Communicator Password, a Check Sum, the allotted Polling Slot start position and length. This transaction requires 4 frames.

The Controller process contains a 'look-up' table which maintains the order in which Passwords have been allocated to Communicators.

The Communicator verifies its allotted Polling Slot position by repeating each Bit received from the Controller during each Frame (carrying over from Frame to Frame in which the repeat of Bit 15 is sent during Bit 9 of the subsequent Frame).

The Controller issues a final verification in Bit 14 of Frame 3 which is followed by a further verification response from the Communicator in Bit 15 of Frame 3.

Activity Monitoring Command

At regular intervals determined by its processor, the Controller sequentially interrogates each Communicator to determine its status.

The interrogation is done on a Communicator Password basis.

The Controller transmits the Activity Monitoring Command during Bits 8 thru 11 followed by the a Group Number component of the Password and the Check Sum.

This process uses several (min 3, max 34) Frames, utilising the Extension Command.

As each response is received from the relevant group of 8 Communicators, the Controller transmits a Follow-on Bit during the Bit 14 which instructs all the Communicators to increment the Group Number and respond if applicable.

This process continues until the Follow-on Bit is cleared by the Controller.

Clear Polling Slot Command

This Command is used by the Controller to instruct individual Communicators terminate its transactions and vacate its Polling Slot and to switch to the inactive, listening mode. The Clear Polling Slot Command (all 1's) is transmitted during Bit 8 thru 10 Bit Periods, followed by the first bit of the Check Sum, the Communicator Password and the remainder of the Check Sum. The Communicator responds with a Verification Bit in Bit 15 of Frame 1.

Mode Command

The Mode Command is used by either Controller or Communicator to request a change in Mode of a Communicator.

The Mode Command is transmitted during Bit 8 thru 11 Bit Periods, followed by the Communicator Password, Mode Change, and Check Sum. After the Check Sum the Communicator responds with the Mode Change request. At the same time the Controller sends the first 2 bits of the Signal Level message followed by a verification of the Mode Change Request, followed by the last 2 bits of the Signal Level message.

The Communicator then confirms the verification of the Controller in Bit 14.

COMMUNICATOR OVERVIEW SPECIFICATION

| Input/Output Connections | |
|---|---|
| CP8 Smartcard | |
| Clock | 3.11 MHz |
| Data | 8 KBaud half Dupex |
| Power | 5 V @ 50 mA 21 V @ 10 mA @ 10 mSec |
| Peripheral Device Serial I/O | |
| Data | 9.6 KBaud rate peak @ 8 KBaud average transfer rate |
| Functions | Data Set Ready (DSR) -Clear to Send (CTS) |
| Peripheral Functions | |
| Keyboard | 4*4 |
| Display | 9 Character 1 line |
| Beep | Audio tone |
| Light Flash | LED |
| Voice Option | |
| Sync | 8 KHz |
| Clock | 2.048 MHz |
| Data | 2.028 MBaud Full Duplex |
| Power Supply | NiCd rechargeable with Solar Cell charge. |

There has thus been shown and described a novel passive universal communicator system which fulfills all the objects and advantages sought therefor. Many changes, modifications, variations and other uses and applications of the subject invention will, however, become apparent to those skilled in the art after considering this specification and the accompanying drawings which discloses the preferred embodiment thereof. All such changes modifications, variations and other uses and applications which do not depart from the spirit and scope of the invention are deemed to be covered by the invention which is limited only by the claims which follow.

What is claimed is:

1. In apparatus for two-way communication between a transmitter/receiver unit, called a controller, and at least one second transmitter/receiver unit, called a communicator, said controller comprising:
(a) first means for generating a carrier signal;
(b) second means for modulating said carrier signal with a first informational signal to produce a first modulated carrier signal;
(c) third means for transmitting said first modulated carrier signal as a first electromagnetic wave signal to said communicator;
(d) fourth means for receiving a second electromagnetic wave signal transmitted by said communicator to reproduce a second modulated carrier signal; and
(e) fifth means for demodulating said second modulated carrier signal to reproduce a second informational signal;

each of said communicators comprising:
(a) sixth means for receiving said first electromagnetic wave signal transmitted by said controller to reproduce said first modulated carrier signal;
(b) seventh means for demodulating said first modulated carrier signal to reproduce said first informational signal;
(c) eighth means for backscatter modulating said first modulated carrier signal with a second informational signal to produce a second modulated carrier signal; and
(d) ninth means for transmitting said second modulated carrier signal as said second electromagnetic wave signal;

the improvement wherein said first means comprises means for pseudo-randomly varying the frequency or phase of said carrier signal and said fifth means includes means for mixing said carrier signal with said second modulated carrier signal, thereby to provide security against jamming, eavesdropping, and/or range gating on said first or second electromagnetic wave signal.

2. The apparatus defined in claim 1, wherein said first means comprises a voltage controlled oscillator (VCO) and means for pseudo-randomly varying the voltage applied to said VCO.

3. The apparatus defined in claim 1, wherein said first means comprises a frequency synthesizer for producing a signal of substantially constant frequency, and a signal mixer, coupled to the output of said frequency synthesizer, for mixing a pseudo-randomly varying signal with said constant frequency signal, thereby to vary the phase of said frequency signal.

4. In apparatus for two-way communication between a transmitter/receiver unit, called a controller, and at least one second transmitter/receiver unit, called a communicator, said controller comprising:
(a) first means for generating a carrier signal;
(b) second means for modulating said carrier signal with a first informational signal to produce a first modulated carrier signal;
(c) third means for transmitting said first modulated carrier signal as a first electromagnetic wave signal to said communicator;
(d) fourth means for receiving a second electromagnetic wave signal transmitted by said communicator to reproduce a second modulated carrier signal; and
(e) fifth means for demodulating said second modulated carrier signal to reproduce a second informational signal;

each of said communicators comprising:

(a) sixth means for receiving said first electromagnetic wave signal transmitted by said controller to reproduce said first modulated carrier signal;
(b) seventh means for demodulating said first modulated carrier signal to reproduce said first informational signal;
(c) eighth means for backscatter modulating said first modulated carrier signal with a second informational signal to produce a second modulated carrier signal; and
(d) ninth means for transmitting said second modulated carrier signal as said second electromagnetic wave signal;

the improvement wherein said third means and said ninth means include means for orthogonally polarizing said first and second electromagnetic wave signals with respect to each other, thereby to minimize cross talk and the sensitivity of the received signals to the relative orientation of said first and second antennas.

5. The apparatus defined in claim 4, wherein said first and second electromagnetic signals are linearly cross polarized.

6. The apparatus defined in claim 4, wherein said first and second electromagnetic signals are circularly cross polarized.

7. The apparatus defined in claim 4, wherein said third means and said fourth means include a common first antenna and said sixth means and said ninth means include a common second antenna, said first and said second antennas being configured to transmit and receive orthogonally polarized first and second electromagnetic wave signals, respectively.

8. In apparatus for two-way communication between a transmitter/receiver unit, called a controller, and at least one second transmitter/receiver unit, called a communicator, said controller comprising:
(a) first means for generating a carrier signal;
(b) second means for modulating said carrier signal with a first informational signal to produce a first modulated carrier signal;
(c) third means for transmitting said first modulated carrier signal as a first electromagnetic wave signal to said communicator;
(d) fourth means for receiving a second electromagnetic wave signal transmitted by said communicator to reproduce a second modulated carrier signal; and
(e) fifth means for demodulating said second modulated carrier signal to reproduce a second informational signal;

each of said communicators comprising:
(a) sixth means for receiving said first electromagnetic wave signal transmitted by said controller to reproduce said first modulated carrier signal;
(b) seventh means for demodulating said first modulated carrier signal to reproduce said first informational signal;
(c) eighth means for backscatter modulating said first modulated carrier signal with a second informational signal to produce a second modulated carrier signal; and
(d) ninth means for transmitting said second modulated carrier signal as said second electromagnetic wave signal;

the improvement wherein said sixth means and said ninth means include a common antenna, a common quadrature polarization changeover switch, and first and second feed line means connecting said changeover switch with orthogonal first and second feed points, respectively, on said antenna; said changeover switch including means for alternating connections between said first and second feed line means, respectively, on one side, and the output of said sixth means and input of said ninth means, respectively, on the other side, thereby to alternate connection of said antenna between said sixth and said ninth means.

9. The apparatus defined in claim 8, wherein said antenna is a patch antenna and said orthogonal first and second feed points are 90° apart around the edge of the antenna with respect to its center.

10. The apparatus defined in claim 8, wherein said changeover switch comprises four GaAs transistors connected in series with the source of each transistor connected to the drain of another transistor to form a bridge circuit with four node points at the source and drain connections.

11. The apparatus defined in claim 10, wherein two node points on opposite sides of said bridge circuit are each connected, respectively, to two opposite feed points of said antenna through a capacitor and the two remaining node points on opposite sides of said bridge circuit are each connected, respectively, to the remaining two opposite feed points of said antenna through an inductor.

12. The apparatus defined in claim 10, wherein said eighth means includes means for applying control signals to the gates of said transistors.

13. The apparatus defined in claim 12, wherein a common control signal is applied to the gates of two opposite transistors in said bridge circuit and the complement of said common control signal is applied to the gates of the remaining two transistors in said bridge circuit.

14. In apparatus for two-way communication between a transmitter/receiver unit, called a controller, and at least one second transmitter/receiver unit, called a communicator, said controller comprising:
(a) first means for generating a carrier signal;
(b) second means for modulating said carrier signal with a first informational signal to produce a first modulated carrier signal;
(c) third means for transmitting said first modulated carrier signal as a first electromagnetic wave signal to said communicator;
(d) fourth means for receiving a second electromagnetic wave signal transmitted by said communicator to reproduce a second modulated carrier signal; and
(e) fifth means for demodulating said second modulated carrier signal to reproduce a second informational signal;

each of said communicators comprising:
(a) sixth means for receiving said first electromagnetic wave signal transmitted by said controller to reproduce said first modulated carrier signal;
(b) seventh means for demodulating said first modulated carrier signal to reproduce said first informational signal;
(c) eighth means for backscatter modulating said first modulated carrier signal with a second informational signal to produce a second modulated carrier signal; and (d) ninth means for transmitting said second modulated carrier signal as said second electromagnetic wave signal;

the improvement wherein said seventh means comprises a delay line having first and second terminals at opposite ends and connected to receive said first modulated carrier signal at said first terminal and said second modulated carrier signal at said opposite terminal; signal summing means having two inputs and an output; a first diode connecting in the forward direction said first terminal with one of said inputs and a second diode connecting in the forward direction said second terminal with said other input; said output of said summing means providing said first informational signal, independent of the standing wave ratio.

15. The apparatus defined in claim 14, wherein said delay line delays the signal passing therethrough by 90° of the phase of said carrier signal.

16. The apparatus defined on claim 14, wherein said first informational signal forms a serial bit stream, and wherein said delay line delays a signal by one bit period of said first informational signal.

17. In apparatus for two-way communication between a transmitter/receiver unit, called a controller, and at least one second transmitter/receiver unit, called a communicator, said controller comprising:

(a) first means for generating a carrier signal;

(b) second means for modulating said carrier signal with a first informational signal to produce a first modulated carrier signal;

(c) third means for transmitting said first modulated carrier signal as a first electromagnetic wave signal to said communicator;

(d) fourth means for receiving a second electromagnetic wave signal transmitted by said communicator to reproduce a second modulated carrier signal; and (e) fifth means for demodulating said second modulated carrier signal to reproduce a second informational signal;

each of said communicators comprising:

(a) sixth means for receiving said first electromagnetic wave signal transmitted by said controller to reproduce said first modulated carrier signal;

(b) seventh means for demodulating said first modulated carrier signal to reproduce said first informational signal;

(c) eighth means for backscatter modulating said first modulated carrier signal with a second informational signal to produce a second modulated carrier signal; and (d) ninth means for transmitting said second modulated carrier signal as said second electromagnetic wave signal;

the improvement comprising tracking cancellation circuit means, coupled between said third means and said fourth means, for producing a cancellation signal in dependence upon said first modulated carrier signal, said cancellation signal being injected into the receiving path of said fourth means to reduce echo and cross talk in said second modulated carrier signal.

18. The apparatus defined in claim 17, wherein said cancellation circuit means includes means for adjusting the amplitude of said cancellation signal.

19. The apparatus defined in claim 17, wherein said cancellation circuit means includes means for adjusting the phase of said cancellation signal.

20. In apparatus for two-way communication between a transmitter/receiver unit, called a controller, and at least one second transmitter/receiver unit, called a communicator, said controller comprising:

(a) first means for generating a carrier signal;

(b) second means for modulating said carrier signal with a first informational signal to produce a first modulated carrier signal;

(c) third means for transmitting said first modulated carrier signal as a first electromagnetic wave signal to said communicator;

(d) fourth means for receiving a second electromagnetic wave signal transmitted by said communicator to reproduce a second modulated carrier signal; and (e) fifth means for demodulating said second modulated carrier signal to reproduce a second informational signal;

each of said communicators comprising:

(a) sixth means for receiving said first electromagnetic wave signal transmitted by said controller to reproduce said first modulated carrier signal;

(b) seventh means for demodulating said first modulated carrier signal to reproduce said first informational signal;

(c) eighth means for backscatter modulating said first modulated carrier signal with a second informational signal to produce a second modulated carrier signal; and (d) ninth means for transmitting said second modulated carrier signal as said second electromagnetic wave signal;

the improvement wherein said fifth means comprises a quadrature detector, coupled to said first means and said fourth means, for producing quadrature in-phase (I) and quadrature phase (Q) outputs and a quadrature summing amplifier, coupled to said quadrature detector, for summing said in-phase and quadrature phase outputs.

21. The apparatus defined in claim 20, wherein said eighth means provides frequency shift key modulation, and wherein said fifth means further includes a frequency shift key demodulator comprising:

(1) a first channel coupled to receive the output of said quadrature summing amplifier comprising a first band pass filter and a first log detector connected in series;

(2) a second channel coupled to receive the output of said quadrature summing amplifier and comprising a second band pass filter and a second log detector connected in series; and (3) a difference amplifier connected to the outputs of said first and second channels for producing an output signal representing the difference between the output signals received from said first and second channels.

22. The apparatus defined in claim 21, wherein said frequency shift key demodulator further comprises a summing amplifier connected to the outputs of the first and second channels for producing an output signal representing the sum of the output signals received from said first and second channels.

23. In apparatus for two-way communication between a transmitter/receiver unit, called a controller, and at least one second transmitter/receiver unit, called a communicator,
  said controller comprising:
  (a) first means for generating a carrier signal;
  (b) second means for modulating said carrier signal with a first informational signal to produce a first modulated carrier signal;
  (c) third means for transmitting said first modulated carrier signal as a first electromagnetic wave signal to said communicator;
  (d) fourth means for receiving a second electromagnetic wave signal transmitted by said communicator to reproduce a second modulated carrier signal; and
  (e) fifth means for demodulating said second modulated carrier signal to reproduce a second informational signal;
  each of said communicators comprising:
  (a) sixth means for receiving said first electromagnetic wave signal transmitted by said controller to reproduce said first modulated carrier signal;
  (b) seventh means for demodulating said first modulated carrier signal to reproduce said first informational signal;
  (c) eighth means for backscatter modulating said first modulated carrier signal with a second informational signal to produce a second modulated carrier signal; and
  (d) ninth means for transmitting said second modulated carrier signal as said second electromagnetic wave signal;
  the improvement wherein said second means includes means for amplitude modulating said carrier signal with three zone bit coding,
  a first zone bit being modulated at the 100% level;
  a second zone bit being modulated between the 50 and 100% levels in dependence upon said first informational signal; and
  a third zone bit being modulated at the 50% level.

24. The apparatus defined in claim 23, wherein said seventh means includes means for determining when said third zone bit is at a zero level, and said eighth means includes means for retransmitting the last bit sent when a received third bit is at a zero level.

25. The apparatus defined in claim 23, wherein said first zone bit is modulated at the 50% level at the beginning of each digital frame.

26. In apparatus for two-way communication between a transmitter/receiver unit, called a controller, and at least one second transmitter/receiver unit, called a communicator,
  said controller comprising:
  (a) first means for generating a carrier signal;
  (b) second means for modulating said carrier signal with a first informational signal to produce a first modulated carrier signal;
  (c) third means for transmitting said first modulated carrier signal as a first electromagnetic wave signal to said communicator;
  (d) fourth means for receiving a second electromagnetic wave signal transmitted by said communicator to reproduce a second modulated carrier signal; and
  (e) fifth means for demodulating said second modulated carrier signal to reproduce a second informational signal;
  each of said communicators comprising:
  (a) sixth means for receiving said first electromagnetic wave signal transmitted by said controller to reproduce said first modulated carrier signal;
  (b) seventh means for demodulating said first modulated carrier signal to reproduce said first informational signal;
  (c) eighth means for backscatter modulating said first modulated carrier signal with a second informational signal to produce a second modulated carrier signal; and
  (d) ninth means for transmitting said second modulated carrier signal as said second electromagnetic wave signal;
  the improvement wherein said eighth means includes image reject mixer means and means for selecting one of the upper and lower sidebands for single sideband modulation.

27. In apparatus for two-way communication between a transmitter/receiver unit, called a controller, and at least one second transmitter/receiver unit, called a communicator,
  said controller comprising:
  (a) first means for generating a carrier signal;
  (b) second means for modulating said carrier signal with a first informational signal to produce a first modulated carrier signal;
  (c) third means for transmitting said first modulated carrier signal as a first electromagnetic wave signal to said communicator;
  (d) fourth means for receiving a second electromagnetic wave signal transmitted by said communicator to reproduce a second modulated carrier signal; and
  (e) fifth means for demodulating said second modulated carrier signal to reproduce a second informational signal;
  each of said communicators comprising:
  (a) sixth means for receiving said first electromagnetic wave signal transmitted by said controller to reproduce said first modulated carrier signal;
  (b) seventh means for demodulating said first modulated carrier signal to reproduce said first informational signal;
  (c) eighth means for backscatter modulating said first modulated carrier signal with a second informational signal to produce a second modulated carrier signal; and
  (d) ninth means for transmitting said second modulated carrier signal as said second electromagnetic wave signal;
  the improvement wherein said fifth means includes image reject mixer means for mixing both said carrier signal and a 90° delayed version of said carrier signal with said second modulated carrier signal; means for separating the upper and lower sidebands; and means for demodulating the selected sideband.

28. In apparatus for two-way communication between a transmitter/receiver unit, called a controller, and at least one second transmitter/receiver unit, called a communicator,
  said controller comprising:
  (a) first means for generating a carrier signal;
  (b) second means for modulating said carrier signal with a first informational signal to produce a first modulated carrier signal;

(c) third means including a first antenna for transmitting said first modulated carrier signal as a first electromagnetic wave signal to said communicator;

(d) fourth means including said first antenna for receiving a second electromagnetic wave signal transmitted by said communicator to reproduce a second modulated carrier signal; and (e) fifth means for demodulating said second modulated carrier signal to reproduce a second informational signal;

each of said communicators comprising:

(a) sixth means including a second antenna for receiving said first electromagnetic wave signal transmitted by said controller to reproduce said first modulated carrier signal;

(b) seventh means for demodulating said first modulated carrier signal to reproduce said first informational signal;

(c) eighth means for backscatter modulating said first modulated carrier signal with a second informational signal to produce said second modulated carrier signal; and (d) ninth means including said second antenna for transmitting said second modulated carrier signal as said second electromagnetic wave signal;

the improvement wherein said third means and said fourth means include means for orthogonally polarizing said first and second electromagnetic wave signals with respect to each other, thereby to minimize cross talk and the sensitivity of the received signals to the relative orientation of said first and second antennas.

29. The apparatus defined in claim 28, wherein said first and second electromagnetic signals are linearly cross polarized.

30. The apparatus defined in claim 28, wherein said first and second electromagnetic signals are circularly cross polarized.

31. The apparatus defined in claim 28, wherein said third means and said fourth means include a common first antenna and said sixth means and said ninth means include a common second antenna, said first and said second antennas being configured to transmit and receive orthogonally polarized first and second electromagnetic wave signals, respectively.

32. The apparatus defined in claim 28, wherein said first means comprises means for pseudo-randomly varying the frequency or phase of said carrier signal and said fifth means includes means for mixing said carrier signal with said second modulated carrier signal, thereby to provide security against jamming, eavesdropping, and/or range gating on said first or second electromagnetic wave signal.

33. The apparatus defined in claim 32, wherein said first means comprises a voltage controlled oscillator (VCO) and means for psuedo-randomly varying the voltage applied to said VCO.

34. The apparatus defined in claim 32, wherein said first means comprises a frequency synthesizer for producing a signal of substantially constant frequency, and a signal mixer, coupled to the output of said frequency synthesizer, for mixing a pseudo-randomly varying signal with said constant frequency signal, thereby to vary the phase of said frequency signal.

35. The apparatus defined in claim 28, wherein said sixth means and said ninth means include a common antenna, a common quadrature polarization changeover switch, and first and second feed line means connecting said changeover switch with orthogonal first and second feed points, respectively, on said antenna; said changeover switch including means for alternating connections between said first and second feed line means, respectively, on one side, and the output of said sixth means and input of said ninth means, respectively, on the other side, thereby to alternate connection of said antenna between said sixth and said ninth means.

36. The apparatus as defined in claim 35, wherein said antenna is a patch antenna and said orthogonal first and second feed points are 90° apart around the edge of the antenna with respect to its center.

37. The apparatus defined in claim 35, wherein said changeover switch comprises four GaAs transistors connected in series with the source of each transistor connected to the drain of another transistor to form a bridge circuit with four node points at the source and drain connections.

38. The apparatus defined in claim 37, wherein two node points on opposite sides of said bridge circuit are each connected, respectively, to two opposite feed points of said antenna through a capacitor and the two remaining node points on opposite sides of said bridge circuit are each connected, respectively, to the remaining two opposite feed points of said antenna through an inductor.

39. The apparatus defined in claim 37, wherein said eighth means includes means for applying control signals to the gates of said transistors.

40. The apparatus defined in claim 39, wherein a common control signal is applied to the gates of two opposite transistors in said bridge circuit and the complement of said common control signal is applied to the gates of the remaining two transistors in said bridge circuit.

41. The apparatus defined in claim 28, further comprising tracking cancellation circuit means, coupled between said third means and said fourth means, for producing a cancellation signal in dependence upon said first modulated carrier signal, said cancellation signal being injected into the receiving path of said fourth means to reduce echo and cross talk in said second modulated carrier signal.

42. The apparatus defined in claim 41, wherein said cancellation circuit means includes means for adjusting the amplitude of said cancellation signal.

43. The apparatus defined in claim 41, wherein said cancellation circuit means includes means for adjusting the phase of said cancellation signal.

44. The apparatus defined in claim 28, the improvement wherein said fifth means comprises a quadrature detector, coupled to said first means and said fourth means, for producing quadrature in-phase (I) and quadrature phase (Q) outputs and a quadrature summing amplifier, coupled to said quadrature detector, for summing said in-phase and quadrature phase outputs.

45. The apparatus defined in claim 44, wherein said eighth means provides frequency shift key modulation, and wherein said fifth means further includes a frequency shift key demodulator comprising:

(1) a first channel coupled to receive the output of said quadrature summing amplifier comprising a first band pass filter and a first log detector connected in series;

(2) a second channel coupled to receive the output of said quadrature summing amplifier and comprising a second band pass filter and a second log detector connected in series; and (3) a difference amplifier connected to the outputs of said first and second channels for producing an output signal representing the difference between the output signals received from said first and second channels.

46. The apparatus defined in claim 45, wherein said frequency shift key demodulator further comprises a summing amplifier connected to the outputs of the first and second channels for producing an output signal representing the sum of the output signals received from said first and second channels.

47. The apparatus defined in claim 28, wherein the improvement wherein said second means includes means for amplitude modulating said carrier signal with three zone bit coding,
   a first zone bit being modulated at the 100% level;
   a second zone bit being modulated between the 50 and 100% levels in dependence upon said first informational signal; and
   a third zone bit being modulated at the 50% level.

48. The apparatus defined in claim 47, wherein said seventh means includes means for determining when said third zone bit is at a zero level, and said eighth means includes means for retransmitting the last bit sent when a received third bit is at a zero level.

49. The apparatus defined in claim 47, wherein said first zone bit is modulated at the 50% level at the beginning of each digital frame.

50. The apparatus defined in claim 28, wherein said eighth means includes image reject mixer means and means for selecting one of the upper and lower sidebands for single sideband modulation.

51. The apparatus defined in claim 28, wherein said fifth means includes image reject mixer means for mixing both said carrier signal and a 90° delayed version of said carrier signal with said second modulated carrier signal; means for separating the upper and lower sidebands; and means for demodulating the selected sideband.

52. In apparatus for two-way communication between a transmitter/receiver unit, called a controller, and at least one second transmitter/receiver unit, called a communicator,
   said controller comprising:
   (a) first means for generating a carrier signal;
   (b) second means for modulating said carrier signal with a first informational signal to produce a first modulated carrier signal;
   (c) third means for transmitting said first modulated carrier signal as a first electromagnetic wave signal to said communicator;
   (d) fourth means for receiving a second electromagnetic wave signal transmitted by said communicator to reproduce a second modulated carrier signal; and
   (e) fifth means for demodulating said second modulated carrier signal to reproduce a second informational signal;
   each of said communicators comprising:
   (a) sixth means for receiving said first electromagnetic wave signal transmitted by said controller to reproduce said first modulated carrier signal;
   (b) seventh means for demodulating said first modulated carrier signal to reproduce said first informational signal;
   (c) eighth means for backscatter modulating said first modulated carrier signal with a second informational signal to produce a second modulated carrier signal; and
   (d) ninth means for transmitting said second modulated carrier signal as said second electromagnetic wave signal;
   the improvement wherein said seventh means comprises a delay line having first and second terminals at opposite ends and connected to receive said first modulated carrier signal at said first terminal and said second modulated carrier signal at said opposite terminal; signal summing means having two inputs and an output; a first diode connecting in the forward direction said first terminal with one of said inputs and a second diode connecting in the forward direction said second terminal with said other input; said output of said summing means providing said first informational signal.

53. The apparatus defined in claim 52, wherein said delay line delays the signal passing therethrough by 90° of the phase of said carrier signal.

54. The apparatus defined on claim 53, wherein said first informational signal forms a serial bit stream, and wherein said delay line delays a signal by one bit period of said first informational signal.

55. A communication system for use in an area having a human environment delimited from below by a floor and from above by an overhead environment substantially clear of human presence, said communication system comprising:
   (a) a first information source for independently generating first information;
   (b) a second information source for independently generating second information;
   (c) a plurality of controllers, each coupled to said first information source and arranged in said overhead environment, for producing a substantially downwardly directed communication beam, imparting said first information to said beam, receiving a reradiated version of said beam and detecting therefrom said second information, the controllers being arranged such that the beams substantially contiguously irradiated a region of said human environment; and
   (d) at least one communicator, coupled to said second information source and arranged in said human environment, having means for receiving one of said beams, detecting said first information from said one beam and supplying said first information to an information user, said communicator including means for reradiating said one beam in the direction of the controller that produced it and means for imparting said second information to the reradiated version of said beam.

56. The communication system defined in claim 55, wherein said second information is at an information rate which is substantially the same as that of said first information.

57. The communication system defined in claim 55, wherein said second information source includes said information user.

58. The communication system defined in claim 55, wherein said beam is a radio frequency electromagnetic wave beam.

59. The communication system defined in claim 55, wherein each one of said controllers is connected to at least one other controller.

60. The communication system defined in claim 59, wherein said controllers are interconnected by hard wiring.

61. The communication system defined in claim 59, wherein said controllers are interconnected by a wireless beam.

62. The communication system defined in claim 59, wherein said wireless beam is substantially contained in said overhead environment.

63. The communication system defined in claim 55, wherein a plurality of controllers are interconnected to form a network, wherein a plurality of distinct networks are formed.

64. The communication system defined in claim 55, wherein said reradiating means includes means for back scattering the incident radiation beam.

65. The communication system defined in claim 64, wherein said reradiating means includes means for modulating the back scattered radiation.

66. The communication system defined in claim 55, wherein said downwardly directed beam and said reradiated beam are cross polarized.

67. The communication system defined in claim 66, wherein said downwardly directed beam and said reradiated beam are linearly polarized.

68. The communication system defined in claim 66, wherein said downwardly directed beam and said reradiated beam are circularly polarized.

69. The communication system defined in claim 55, wherein said one beam is substantially cone-shaped with a substantially vertical axis.

* * * * *